US008311402B2

(12) United States Patent
Steinhauser et al.

(10) Patent No.: US 8,311,402 B2
(45) Date of Patent: Nov. 13, 2012

(54) MODULAR HEATER SYSTEM

(75) Inventors: Louis P. Steinhauser, St. Louis, MO (US); Eric Ellis, Columbia, MO (US); Louis T. Lesch, Belleville, IL (US); Troy Ruben Bolton, Fulton, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 903 days.

(21) Appl. No.: 11/777,709

(22) Filed: Jul. 13, 2007

(65) Prior Publication Data

US 2009/0016707 A1   Jan. 15, 2009

(51) Int. Cl.
*E03B 7/10* (2006.01)
*H05B 3/06* (2006.01)

(52) U.S. Cl. .................. 392/468; 219/522
(58) Field of Classification Search .......... 392/465–496; 137/301–308; 219/522; 138/32–35
See application file for complete search history.

(56) References Cited

U.S. PATENT DOCUMENTS

| | | | |
|---|---|---|---|
| 2,426,976 A | 9/1947 | Taulman | |
| 2,465,208 A * | 3/1949 | De Gelleke | 392/490 |
| 3,351,738 A * | 11/1967 | Kahn | 392/468 |
| 3,364,337 A * | 1/1968 | Kahn | 392/468 |
| 3,398,262 A * | 8/1968 | Kahn | 392/468 |
| 3,519,023 A * | 7/1970 | Burns, Sr. et al. | 138/33 |
| 3,971,416 A | 7/1976 | Johnson | |
| RE29,322 E | 7/1977 | Nelson | |
| 4,080,527 A * | 3/1978 | Volling | 392/468 |
| 4,123,837 A | 11/1978 | Horner | |
| 4,152,577 A | 5/1979 | Leavines | |
| 4,791,277 A | 12/1988 | Montierth et al. | |
| 5,086,836 A | 2/1992 | Barth et al. | |
| 5,294,780 A | 3/1994 | Montierth et al. | |
| 5,853,289 A * | 12/1998 | Todd et al. | 432/225 |
| 6,792,200 B2 | 9/2004 | Hersh | |
| 2007/0108176 A1 | 5/2007 | Ellis | |

FOREIGN PATENT DOCUMENTS

| | | |
|---|---|---|
| EP | 0625669 | 11/1994 |
| FR | 2559874 | 8/1985 |
| JP | 10060958 | 3/1998 |

OTHER PUBLICATIONS

StarFlex Heaters. Glenn Electric Heater Corporation (accessed on Jul. 13, 2007); Retrieved from the internet: <url: http://www.glen-nelectricheater.com/starflex.html.
International Search Report PCT/US2008/069712.

* cited by examiner

*Primary Examiner* — Thor Campbell
(74) *Attorney, Agent, or Firm* — Brinks Hofer Gilson & Lione

(57) ABSTRACT

A heater system is provided that includes a plurality of carrier members, each carrier member defining an inner periphery surface, an outer receiving portion, and connecting portions. A plurality of resistive heating elements are disposed within the outer receiving portions of the carrier members, and end fittings are disposed proximate the carrier members and the resistive heating elements. A cover is disposed around the carrier members and the resistive heating elements, and the inner periphery surfaces of the carrier members are adapted to transfer heat to a target and the connecting portions are adapted to be secured to at least one of an adjacent carrier member and a heating target. In one form, at least one set of a carrier member and a resistive heating element are resiliently movable such that the heater system provides tactile feedback to an installer that the heater system is properly installed around a target.

34 Claims, 23 Drawing Sheets

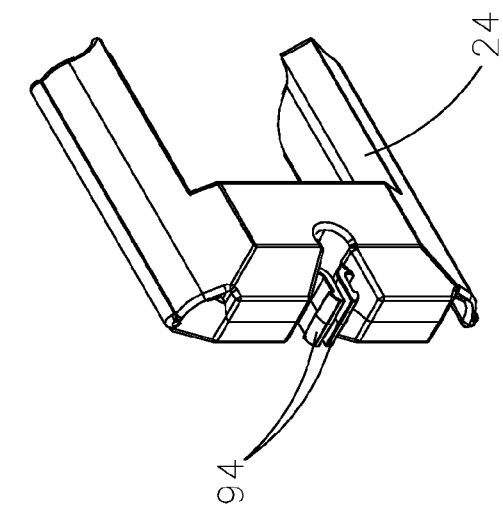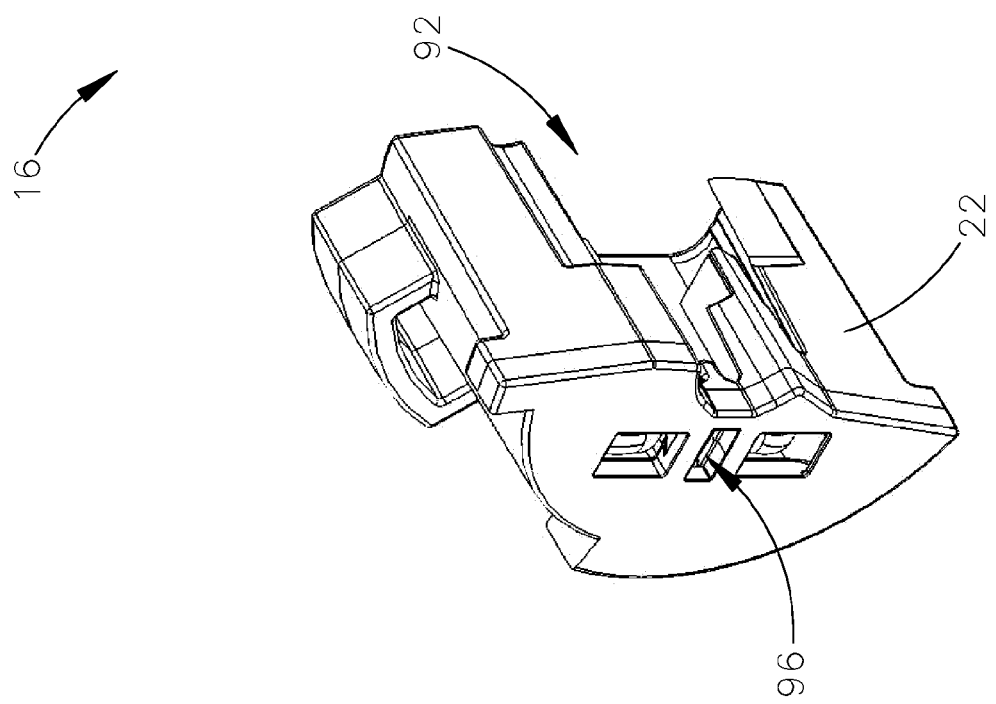
FIG. 16

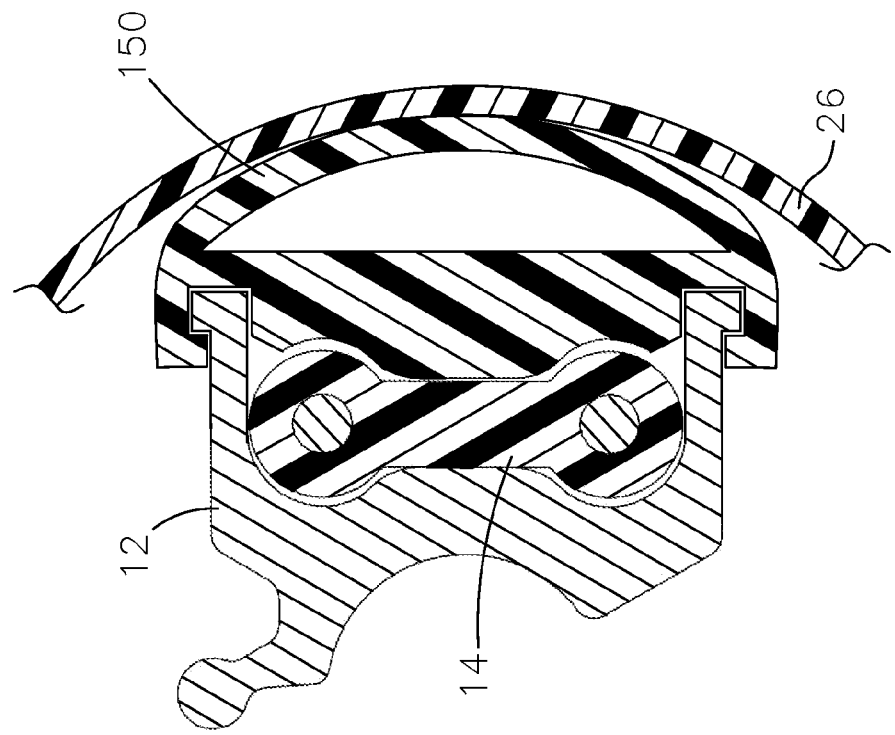
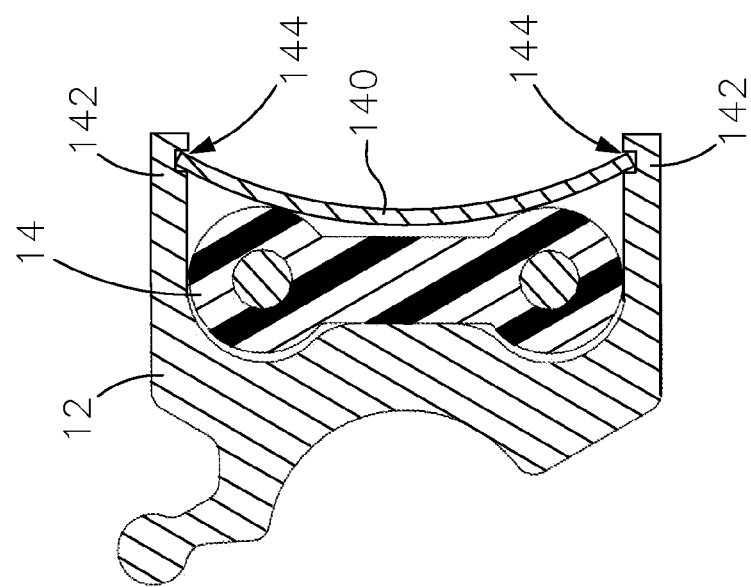
FIG. 22a
FIG. 22b

MODULAR HEATER SYSTEM

FIELD

The present disclosure relates generally to electric heaters for use in pipelines, and more particularly to electric heaters for use in gaslines and pumplines such as, by way of example, semiconductor processing systems.

BACKGROUND

The statements in this section merely provide background information related to the present disclosure and may not constitute prior art.

The supply of fluids such as oil, gas, and water, among others, from a supply, e.g., an oil well or a water reservoir, requires transfer of such fluids by conduits or the like. Maintaining a free or unrestricted flow of the fluids within the conduits is often necessary, in addition to maintaining the fluid at or above a certain temperature. Presently, an electric heater in the form of a cable or a tape, known in the art as a "heat trace," is commonly used around the conduits to provide heat to the conduits and thus to the fluids. Additionally, the conduits and the heat traces are sometimes surrounded by a thermal insulation jacket to reduce heat loss to the surrounding environment.

Heat trace cables are a popular means for heating such fluid conduits due to their relative simplicity and low cost. Generally, heat trace cables are disposed along the length of the conduits or wrapped around the conduits and are fastened at regular intervals with bands, retaining straps or any other suitable fasteners, as shown in U.S. Pat. No. 5,294,780 to Montierth et al., U.S. Pat. No. 5,086,838 to Barth et al., U.S. Pat. No. 4,791,277 to Montierth et al., U.S. Pat. No. 4,152,577 to Leavines, U.S. Pat. No. 4,123,837 to Horner, U.S. Pat. No. 3,971,416 to Johnson, and U.S. Pat. Reissue No. 29,332 to Bilbro. Fastening heat trace cables to the pipe or conduit has proven to be time consuming and burdensome, particularly for replacement of utility lines and continuous manufacturing processes, among others, where time is of the essence.

To expedite the replacement of utility lines, U.S. Pat. No. 8,792,200 proposes a pre-fabricated heat-traced pipe, wherein a pipe to be heated, a heat trace, and a connector for electrically connecting the heat trace to a power source are cured and integrally formed beforehand and inventoried before a need for replacing an old pipe arises. While this prefabricated pipe saves some time with respect to replacement of utility lines, it requires a custom-made heat-traced pipe, thereby increasing undesirable inventory space and manufacturing and maintenance costs.

SUMMARY

In one form, a heater system is provided that comprises a plurality of hinged carrier members, wherein each hinged carrier member defines an inner periphery surface, an outer receiving portion, and end portions. A plurality of heat trace sections are disposed within the outer receiving portions of the hinged carrier members, and the heat trace sections also define end portions. End fittings are disposed proximate the end portions of the hinged carrier members and the end portions of the heat trace sections, and at least one cover is disposed around the hinged carrier members and the heat trace sections, the cover being secured to the end fittings. The inner periphery surfaces of the hinged carrier members are adapted for close proximity with a heating target.

In another form, a heater system is provided that comprises a plurality of carrier members, each carrier member defining an inner periphery surface, an outer receiving portion, end portions, and a hinge element disposed adjacent the outer receiving portion and extending along a longitudinal portion of the carrier member. A plurality of resistive heating elements are disposed within the outer receiving portions of the hinged carrier members, and the resistive heating elements defining end portions. The inner periphery surfaces of the hinged carrier members are adapted for close proximity with a heating target.

In still another form, a heater system is provided that comprises a plurality of carrier members, each carrier member defining an inner periphery surface, an outer receiving portion, and connecting portions. A plurality of resistive heating elements are disposed within the outer receiving portions of the carrier members, and end fittings are disposed proximate end portions of the carrier members and the resistive heating elements. At least one cover is disposed around the carrier members and the resistive heating elements, and the cover is secured to the end fittings. The inner periphery surfaces of the carrier members are adapted to transfer heat to a target and the connecting portions are adapted to be secured to at least one of an adjacent carrier member and a heating target.

Further yet, a heater system is provided that comprises a plurality of carrier members and a corresponding plurality of resistive heating elements disposed within the carrier members. At least one set of a carrier member and a resistive heating element are resiliency movable such that the heater system provides tactile feedback to an installer that the heater system is properly installed around a target.

Further areas of applicability will become apparent from the description provided herein. It should be understood that the description and specific examples are intended for purposes of illustration only and are not intended to limit the scope of the present disclosure.

DRAWINGS

The present disclosure will become more fully understood from the detailed description and the accompanying drawings, wherein:

FIG. 16 is an exploded perspective view of an end fitting having an external shell and an internal shield constructed in accordance with the principles of the present disclosure;

FIG. 22a is a cross-sectional view of a retaining element for a resistive heating element constructed in accordance with the principles of the present disclosure; and FIG. 22b is a cross-sectional view of another retaining element for a resistive heating element constructed in accordance with the principles of the present disclosure.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
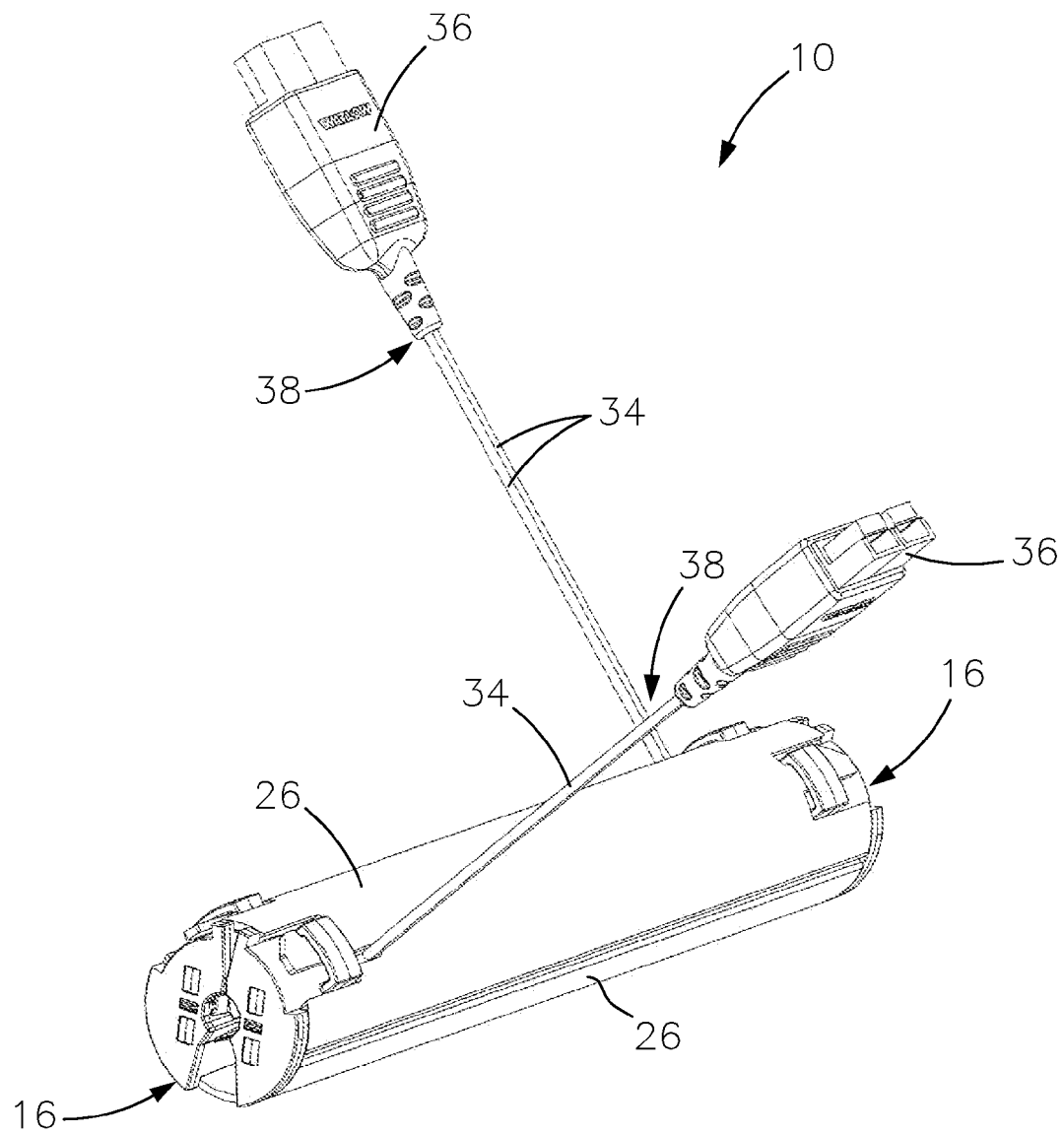
FIG. 1 is a perspective view of a heater system constructed in accordance with the principles of the present disclosure.
Figure 2:
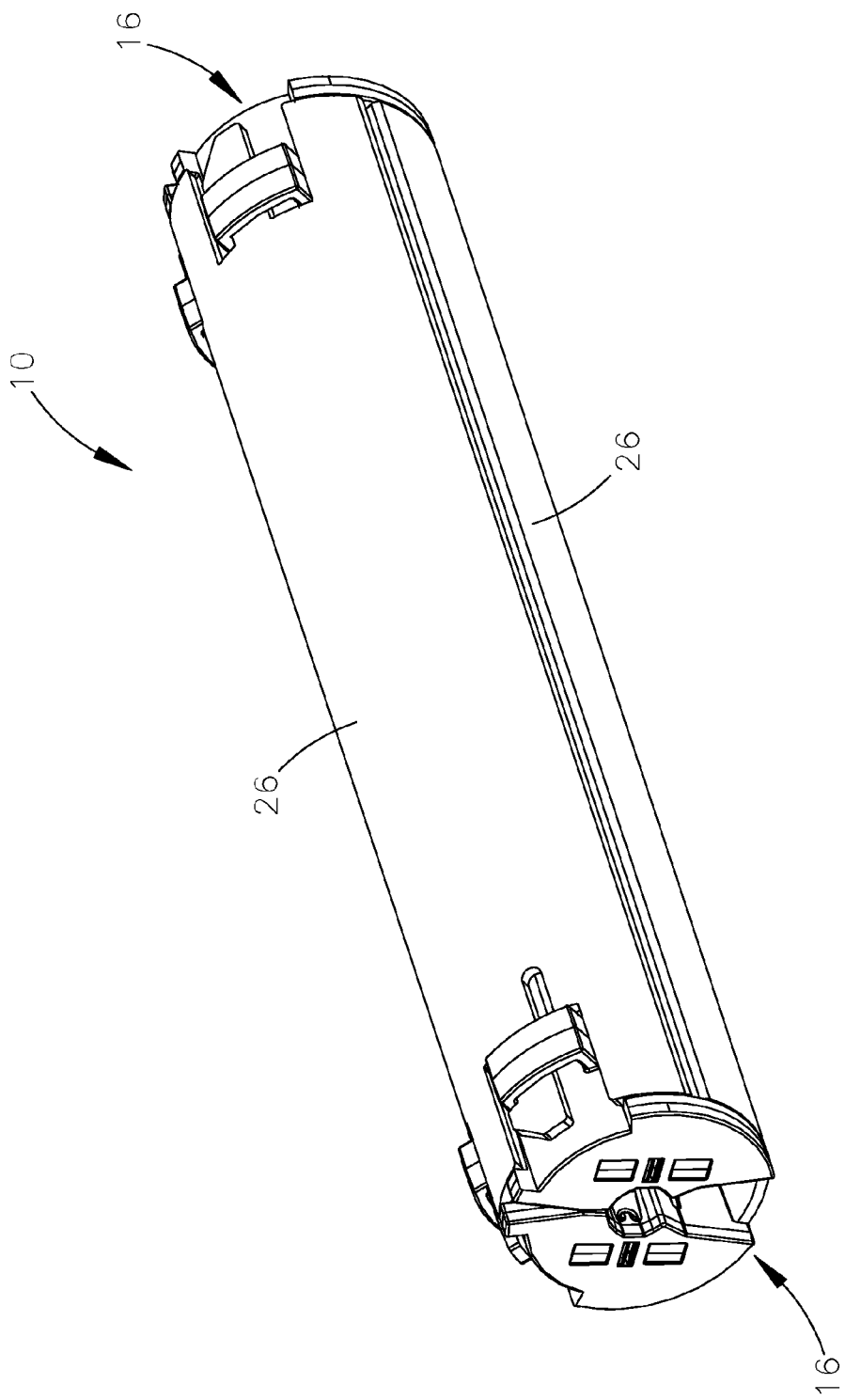
FIG. 2 is an enlarged perspective view of a heater system constructed in accordance with the principles of the present disclosure.
Figure 3:
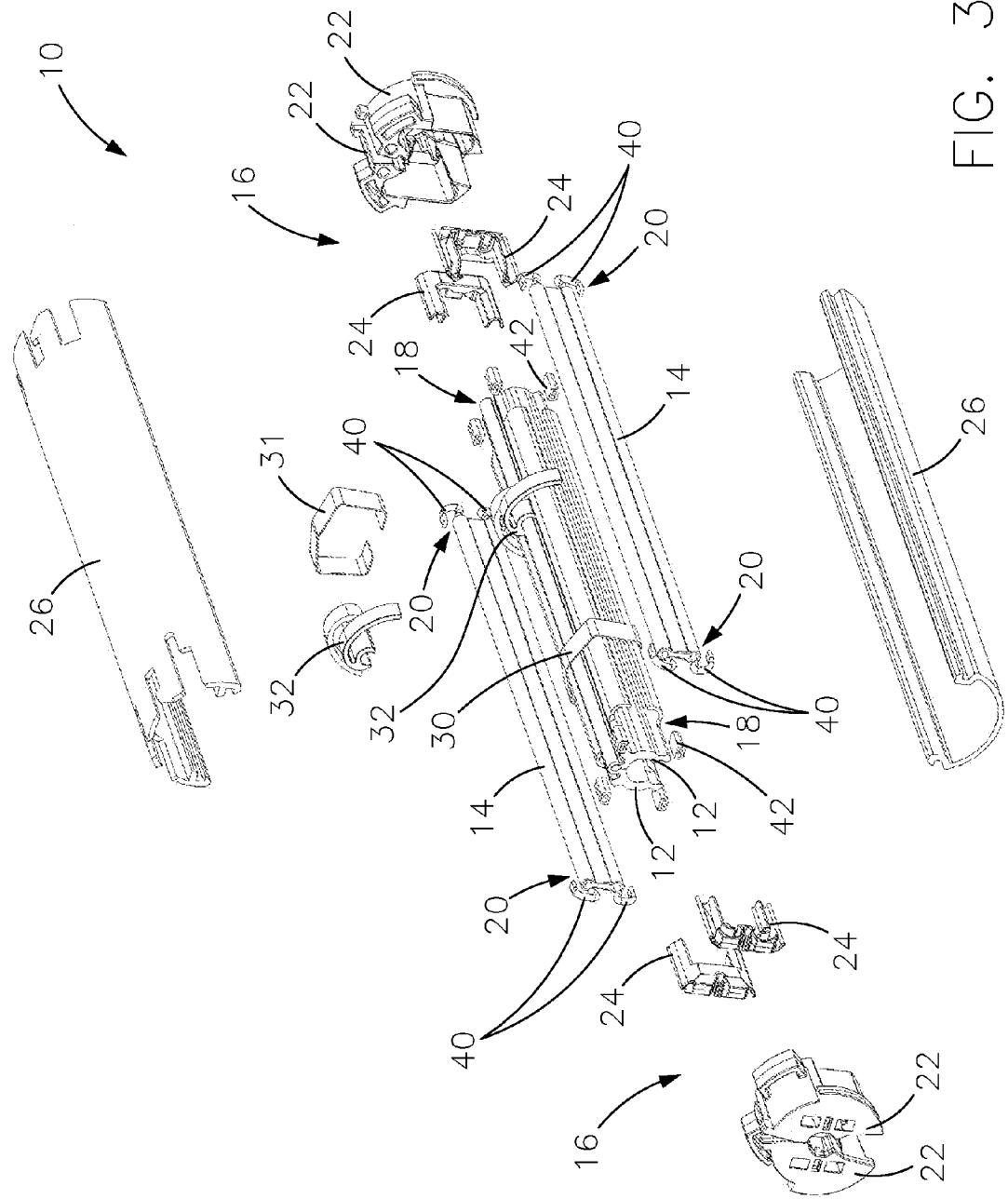
FIG. 3 is an exploded perspective view of the heater system constructed in accordance with the principles of the present disclosure.

Referring to FIGS. 1-3, a heater system in accordance with the principles of the present disclosure is illustrated and generally indicated by reference numeral 10. Generally, the heater system 10 is designed for use in heating components in semiconductor processing systems such as gaslines and pumplines, as described in copending U.S. application Ser. No. 11/520,130, titled "Modular Heater Systems," which is commonly assigned with the present application and the contents of which are incorporated herein by reference in their entirety. It should be understood, however, that the heater system 10 as set forth herein, including its various forms, is not limited to such an application and can be employed in any application to which a target is to be heated, and thus the application to semiconductor processing systems should not be construed as limiting the scope of the present disclosure.

As shown more clearly in FIG. 3, the heater system 10 comprises a plurality of carrier members 12 and a corresponding plurality of resistive heating elements 14. The resistive heating elements 14 in this form of the present disclosure are heat trace sections, which are disposed within the carrier members 12 as shown. Although two carrier members 12 and two corresponding resistive heating elements 14 are illustrated, it should be understood that any number of carrier members 12 and resistive heating elements 14 may be employed while remaining within the scope of the present disclosure. End fittings 18 are disposed proximate end portions 18 of the carrier members 12 and end portions 20 of the resistive heating elements 14. In one form, the end fittings 16 comprise external shells 22 and internal shields 24, which are described in greater detail below.

A two-piece cover 26 is disposed around the carrier members 12 and the resistive heating elements 14, and the cover 26 is secured to the end fittings 16. Although the cover 26 is illustrated as being two pieces, the cover 26 may alternately be a single piece or multiple pieces, or take on the configurations as illustrated and described in copending U.S. application Ser. No. 11/520,130, titled "Modular Heater Systems" while remaining within the scope of the present disclosure. The cover 26 generally functions to retain the heat generated by the resistive heating elements 14 within the heater system 10 so that more heat is directed to the target (not shown) and heat losses to the outside environment are reduced during operation.

The heater system 10 also comprises retaining members 30, which are disposed around at least a portion of the carrier members 12 to clasp the carrier members 12 around the target, which is further illustrated and described in greater detail below. Additionally, a standoff member 32 is disposed along the heater system 10 between the cover 26 and the target to provide a desired positioning between the resistive heating elements 14 and the cover 26 as described in greater detail below.

As further shown, the resistive heating elements 14 are electrically connected to a power source (not shown) through lead wires 34 as shown in FIG. 1, which in one form have connectors 36 disposed at their end portions 38 for ease of installation and removal of the heater system 10. As such, and with reference back to FIG. 3, the resistive heating elements 14 include lead extensions 40 and crimps 42 for electrical connection to the lead wires 34.

Referring now to FIGS. 4-7, the carrier members 12 and resistive heating elements 14 are now illustrated and described in greater detail. As shown, each carrier member 12 defines an inner periphery surface 40 and an outer receiving portion 42. The inner periphery surfaces 40 of the carrier members 12 are adapted for close proximity with a heating target 2 (FIG. 7) such that the heat being generated from the resistive heating elements 14 is efficiently transferred to the heating target 2, including through radiation. As such, in this form, the inner periphery surfaces 40 define a cylindrical configuration to match the shape of the heating target 2, which is a conduit in one exemplary application of the heater system 10. It should be understood, however, that any number of shapes and configurations of the inner periphery surfaces 40 may be employed to accommodate a variety of heating targets while remaining within the scope of the present disclosure.

Figure 4:
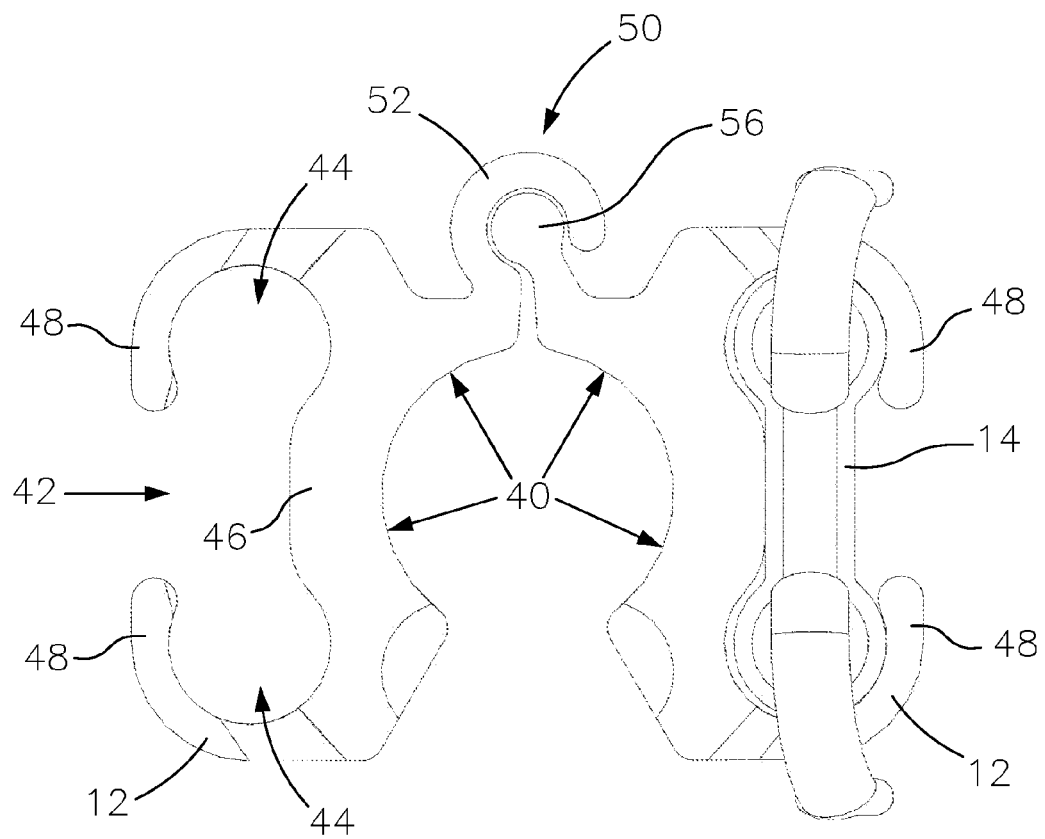
FIG. 4 is an end view of hinged carrier members and a heat trace section constructed in accordance with the principles of the present disclosure.
Figure 5:
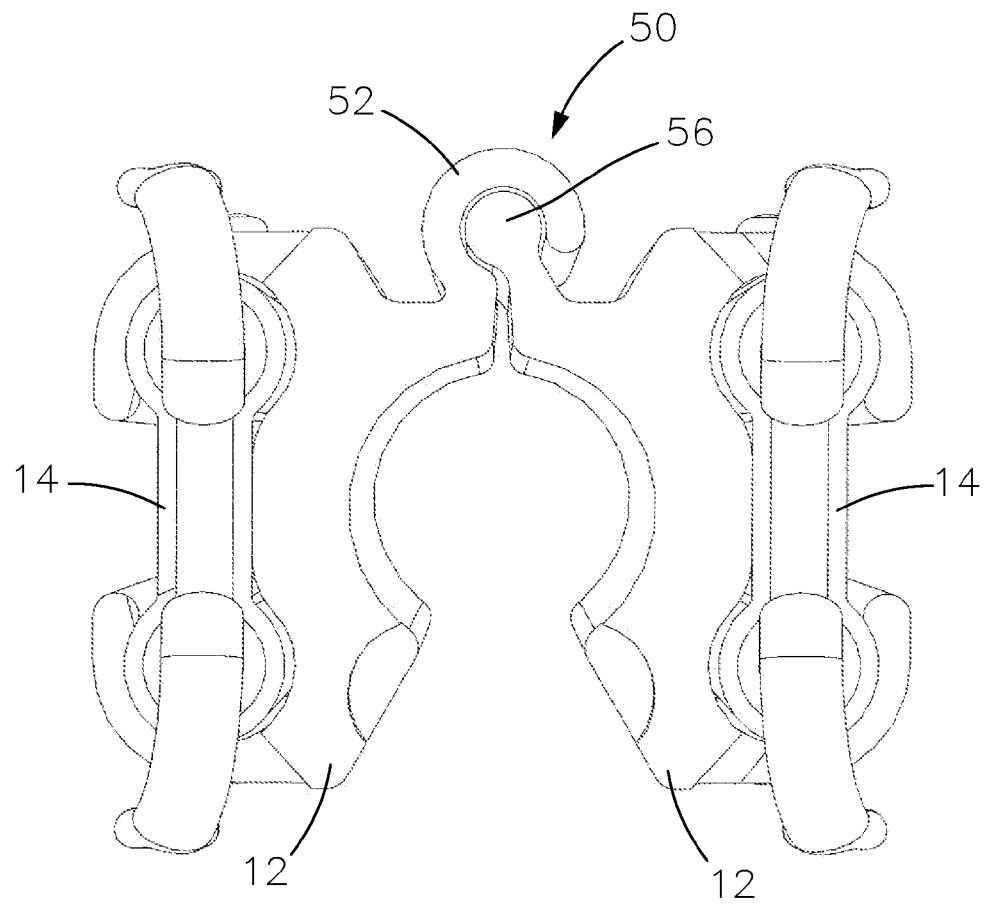
FIG. 5 is an end view of hinged carrier members and heat trace sections constructed in accordance with the principles of the present disclosure.
Figure 6:
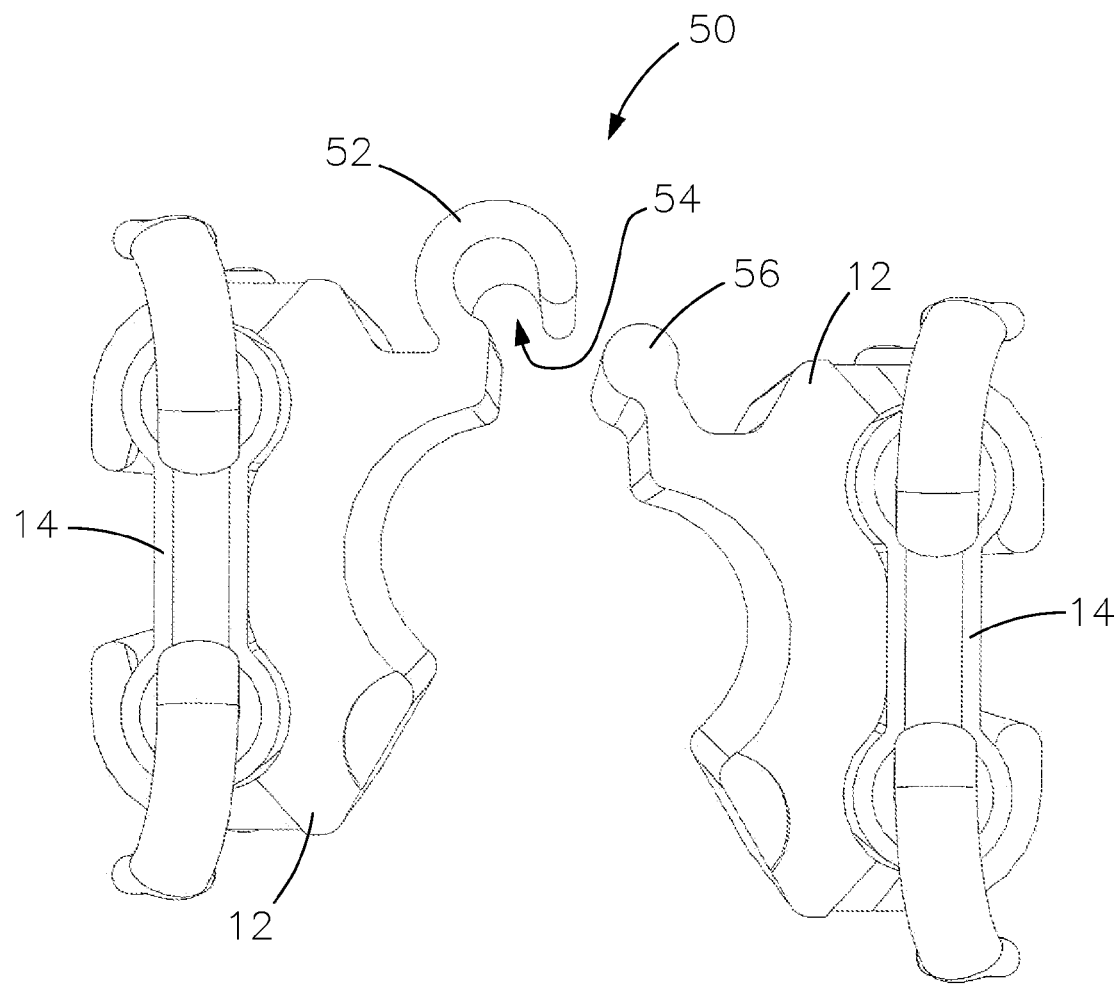
FIG. 6 is an exploded end view of hinged carrier members and heat trace sections constructed in accordance with the principles of the present disclosure.
Figure 7:
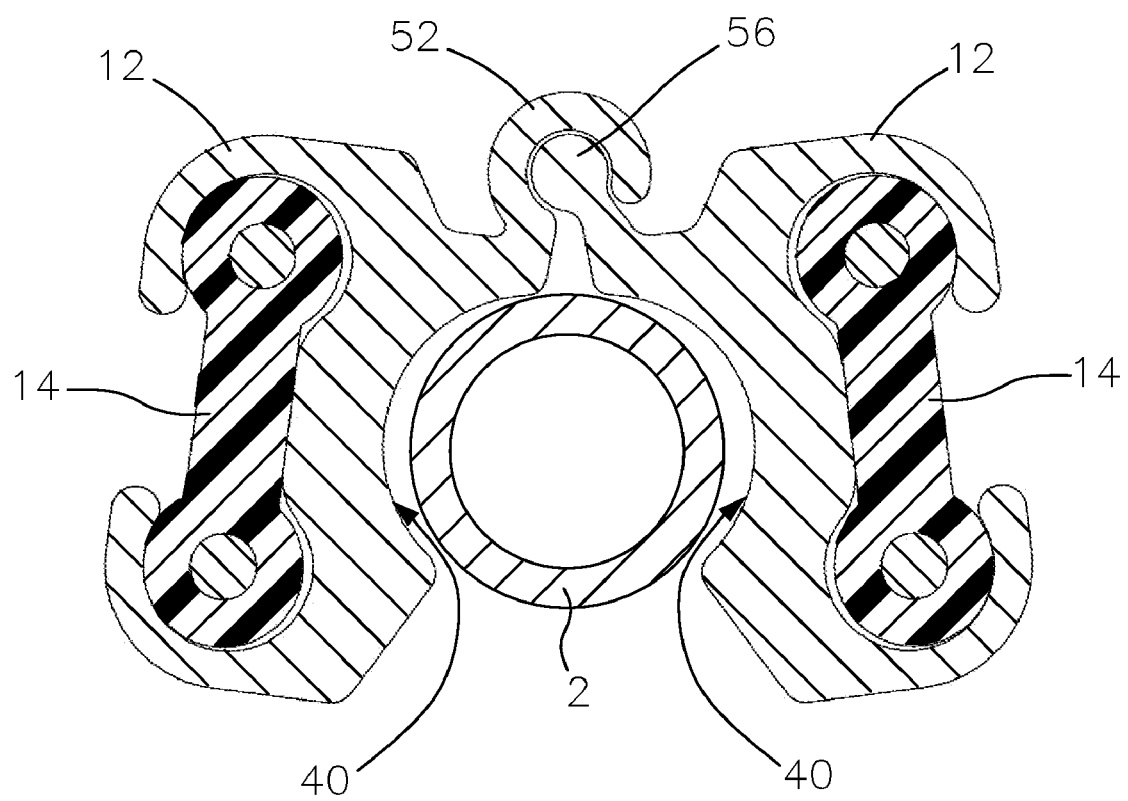
FIG. 7 is a cross-sectional view of hinged carrier members and heat trace sections rotated relative to each other around a target in accordance with the principles of the present disclosure.

The resistive heating elements 14 are disposed within the outer receiving portions 42, and the outer receiving portions 42 are preferably configured to conform to the shape of the resistive heating elements 14, which in this form are heat traces sections, as shown. As such, the outer receiving portions 42 define enlarged end portions 44, an intermediate support 48, and outer retaining walls 48, which retain the resistive heating elements 14 within the carrier members 12. Additionally, the resistive heating elements 14 are conformable to the shape defined by the outer receiving portions 42 of the carrier members 12. The resistive heating elements 14 may be pre-formed to the shape of the outer receiving portions 42 prior to installation, or alternatively, the resistive heating elements 14 may be installed into the carrier members 12 and then the overall assembly (of the carrier member 12 and resistive heating element 14) formed to the shape of the heating target 2. Additionally, the heater system 10 may be provided with only one resistive heating element 14 as shown in FIG. 4, i.e. with an "empty" carrier member 12, or each of the carrier members 12 having a corresponding resistive heating element 14 as shown in FIG. 5. It should also be understood that more than two (2) sets of carrier members 12 and resistive heating elements 14 may be employed while remaining with the scope of the present disclosure. For example, three (3) sets of carrier members 12 and resistive heating elements 14 may be disposed around the target 2 while remaining within the scope of the present disclosure.

As further shown, the carrier members 12 define connecting portions 50, which in this form are hinge elements such that the carrier members 12 are hinged carrier members 12. More specifically, and with reference to FIGS. 6 and 7, one of the carrier members 12 defines a longitudinal protrusion 52 having an internal channel 54, and the adjacent carrier member 12 defines a longitudinal rib 56. The longitudinal rib 56 is disposed within the channel 54 as shown to provide a rotatable connection between the carrier members 12 in this particular embodiment. Accordingly, each set of carrier members 12 and resistive heating elements 14 can be moved relative to one another so that the heater system 12 can be more easily installed onto and removed from a heating target. Additionally, the sets of carrier members 12 and resistive heating elements 14 are capable of being disposed in closer proximity to the heating target with the relative movement for more efficient heat transfer. It should be understood that the hinged carrier members 12 are merely exemplary and that other connecting portions 50 that are adapted to be secured to at least one of an adjacent carrier member 12 and a heating target may be employed while remaining within the scope of the present disclosure. Additional exemplary embodiments of such connecting portions 50 are illustrated, and described in greater detail below.

Figure 8:
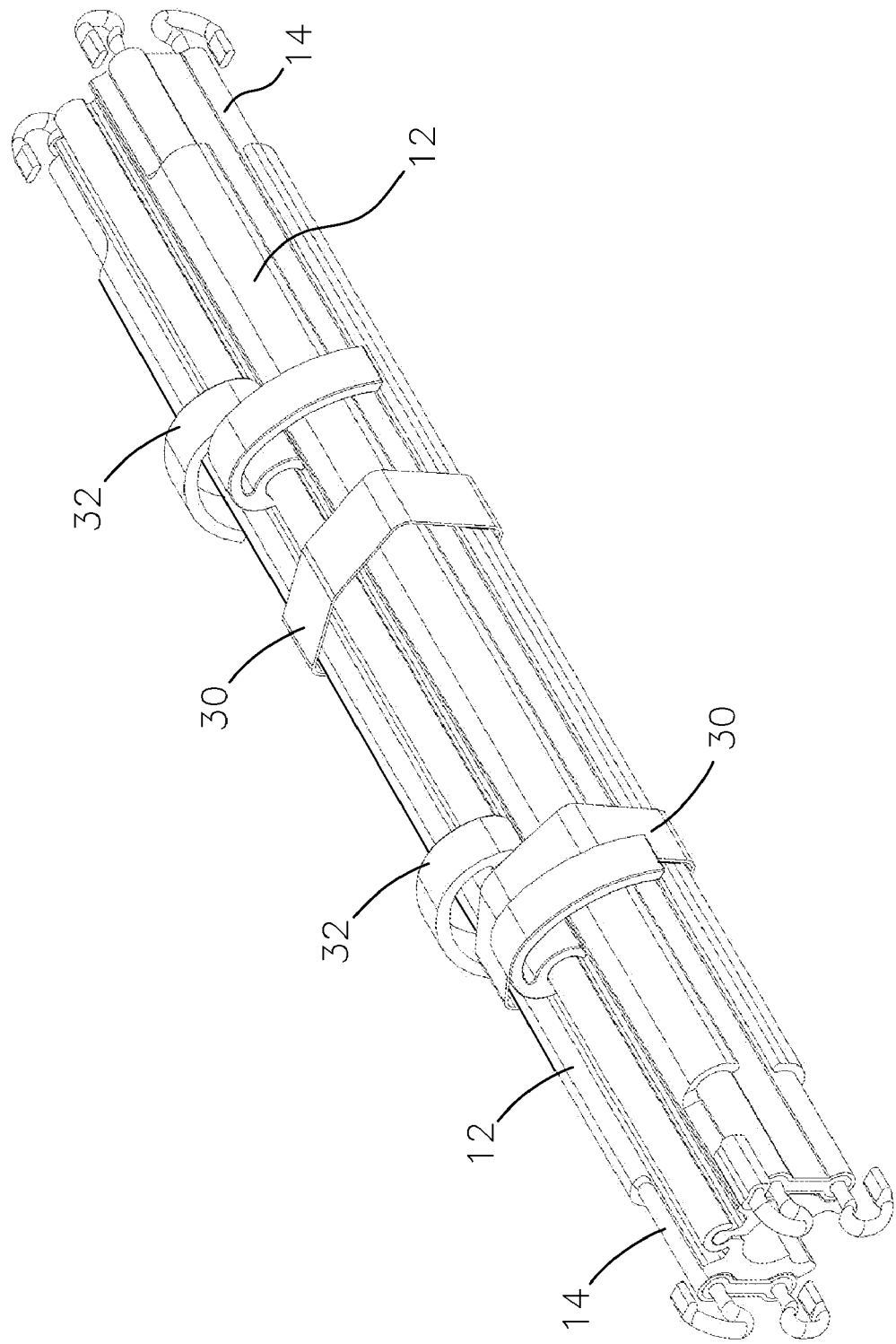
FIG. 8 is a perspective view of various internal components of the heater system constructed in accordance with the principles of the present disclosure.
Figure 9:
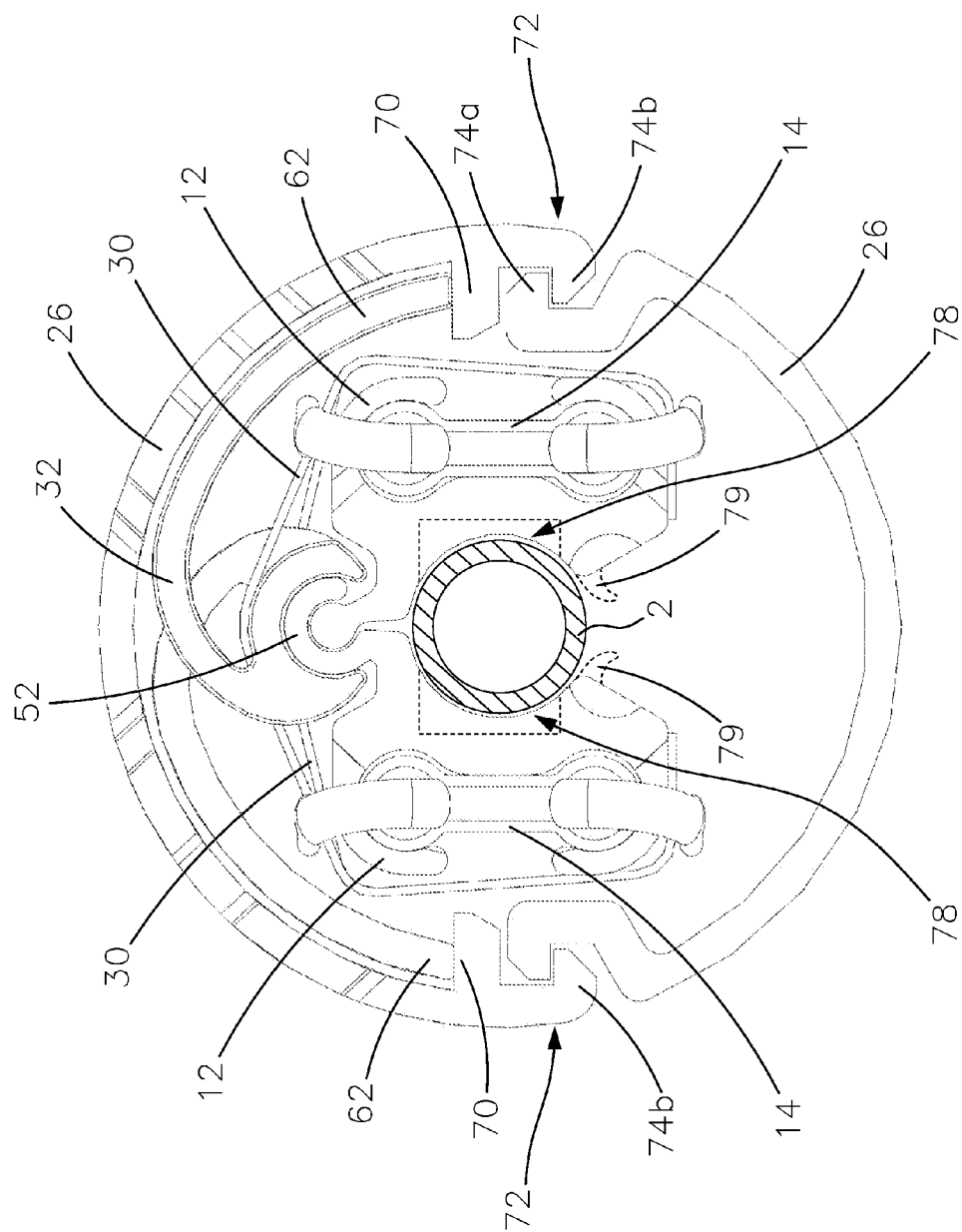
FIG. 9 is an end view of the heater system illustrating a cover, a standoff, and retaining members constructed in accordance with the principles of the present disclosure.
Figure 10:
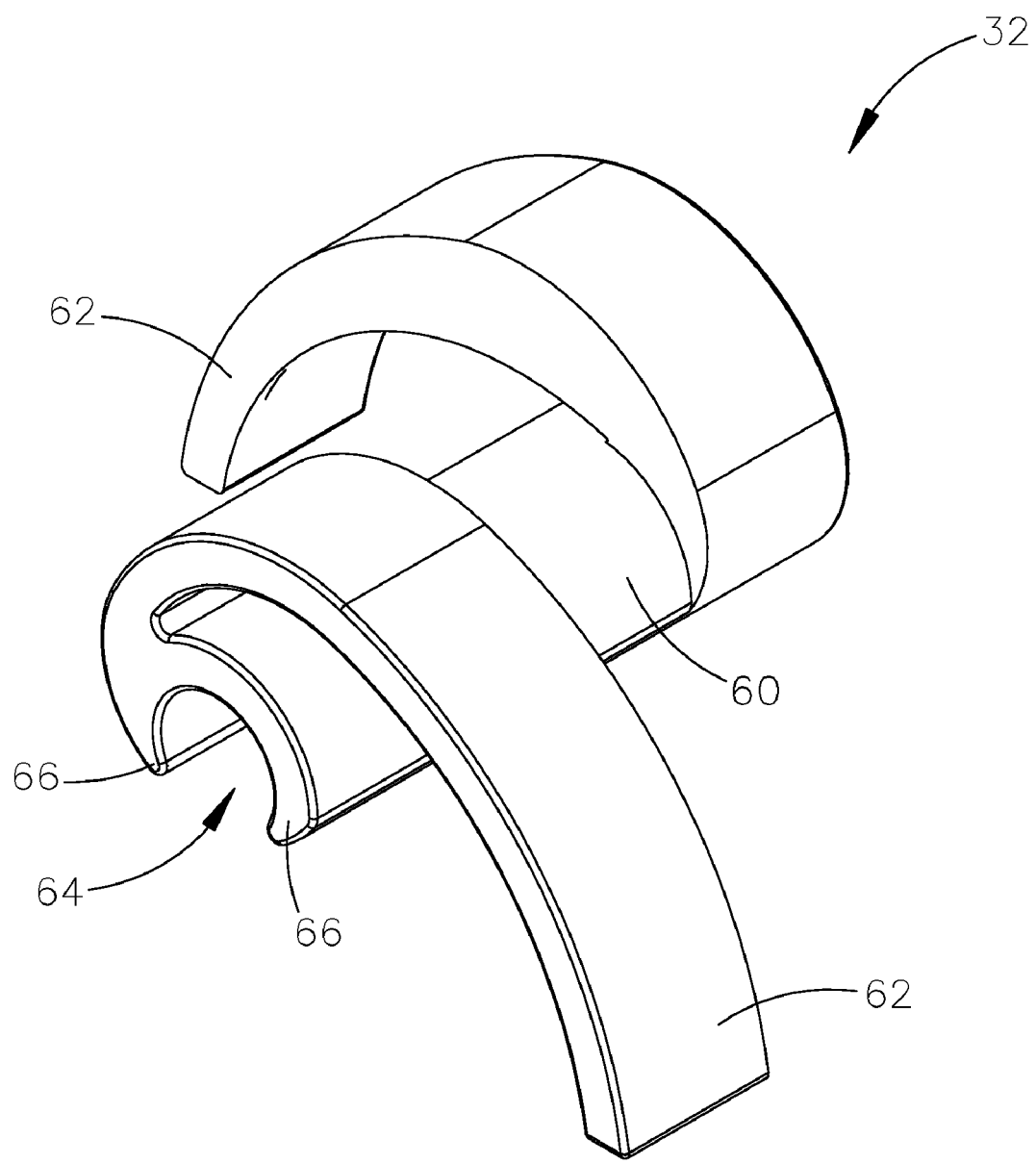
FIG. 10 is a perspective view of a standoff constructed in accordance with the principles of the present disclosure.
Figure 11:
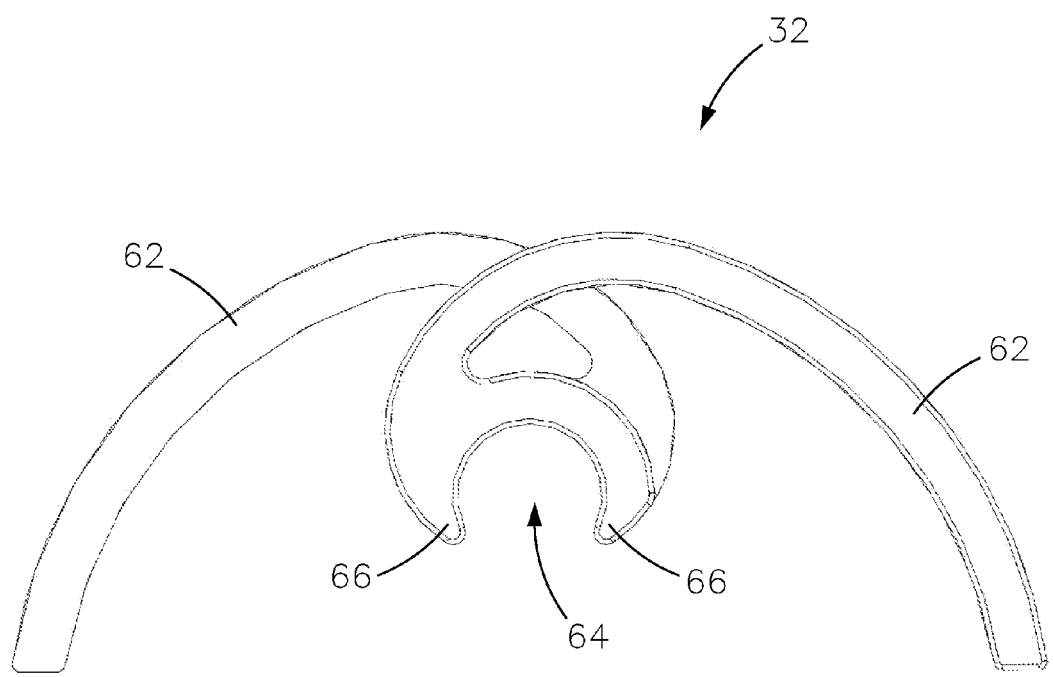
FIG. 11 is an end view of the standoff in accordance with the principles of the present disclosure.
Figure 12:
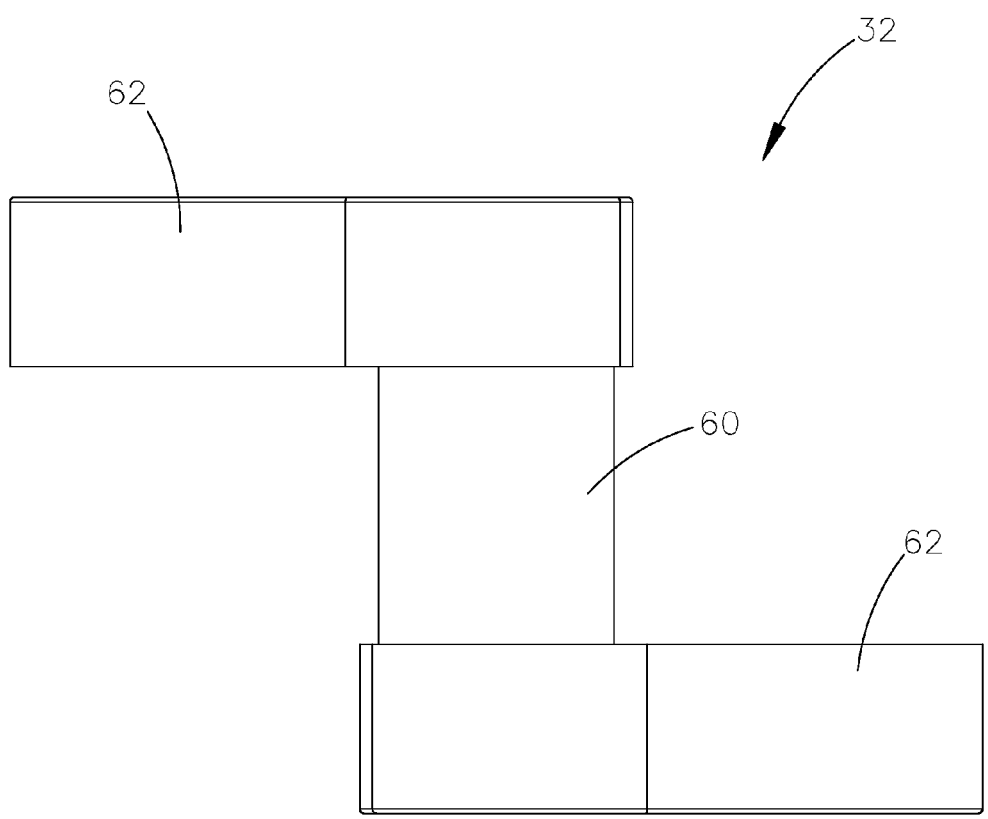
FIG. 12 is a top view of the standoff in accordance with the principles of the present disclosure.

Referring to FIGS. 8 and 9, the retaining members 30 and standoff members 32 are illustrated and now described in greater detail. In one form, two (2) retaining members 30 are disposed along the length of the carrier members 12, although a fewer or greater number may be employed while remaining within the scope of the present disclosure. The retaining members 30 may be installed separately or may be combined with a standoff member 32 as shown. Referring specifically to FIGS. 9-12, the standoff members 32 comprise a central body portion 60 and opposed curved arms 62 that extend from the central body portion 60. The central body portion 60 defines a cavity 64 that is adapted for placement around a portion of the carrier member 12, and more specifically around the longitudinal protrusion 52. Flexible lips 66 are formed along the cavity and are configured such that the lips 66 can elastically deflect for ease of installation and removal from the carrier member 12.

The retaining members 30 are preferably flexible and spring-like, and in one form are fabricated from a relatively thin mild steel material. The standoff members 32 are preferably one-piece and are formed of a high temperature plastic material such as a thermoplastic polymer. It should be understood, however, that other materials and configurations for the retaining members 30 and standoff members 32 may be employed while remaining within the scope of the present disclosure.

Referring back to FIG. 9, the retaining members 30 are illustrated as clasping the carrier member 12 around the target 2, and the standoff members 32 being disposed between the cover 26 and the target 2. Since the retaining members 30 are flexible and are disposed around the carrier members 12 and the resistive heating elements 14, the retaining members 30 function to clasp the carrier members 12 and resistive heating elements 14 around the heating target 2 while allowing for relative movement, e.g., rotation, between adjacent sets of carrier members 12 and resistive heating elements 14. During installation, the flexible or spring-like nature of the retaining members 30 allows the carrier members 12 and the resistive heating elements 14 to be resiliency movable such that the heater system 10 provides tactile feedback to an installer that the heater system 10 is properly installed around the target 2.

As further shown, the standoff member 32 is disposed between the cover 26 and the target 2 and functions to provide a desired spacing, such as concentricity by way of example, between the cover 26 and the target 2 disposed within the carrier members 12 and resistive heating elements 14. More specifically, the opposed curved arms 62 abut flanges 70 extending from an inferior portion of the upper cover 26 to position the cover 26 relative to the carrier members 12 and resistive heating elements 14. As further shown, the two-piece cover 28 comprises interlocking portions 72 along longitudinal edge portions thereof to secure the upper piece of the cover 26 to the lower piece of the cover 26. In one form, these interlocking portions 72 define opposed locking tabs 74a and 74b that engage one another to secure the pieces of the cover 26 together as shown. In this form, the cover 26 is preferably a flexible insulative material that is capable of operating at higher temperatures, such as a high temperature thermoplastic polymer, by way of example.

Additionally, the carrier members 12 may be provided with internal recesses 78 (shown dashed) in order to accommodate a fitting or other adjacent component that may be disposed along the target 2. The recesses 78 may be provided in any shape or size that corresponds with the shape of the fitting or adjacent component, and thus a single carrier member 12 can extend along a heating target 2 and its components without using separate. Individual carrier members 12 or other specially designed members to accommodate the adjacent components or fittings. The recesses 78 may also be employed to accommodate temperature sensors or other discrete indication means incorporated within the heater system 10, such as those disclosed in copending U.S. application Ser. No. 11/520,130, titled "Modular Heater Systems," which has been incorporated herein by reference in its entirety.

Furthermore, alternate forms of retaining members other than the specific, exemplary retaining members 30 as illustrated and described herein may be employed while remaining within the scope of the present disclosure. For example, flexible extensions 79 (shown dashed) may be provided as a part of the carrier members 12, and thus the flexible extensions 79 would be deflected outwardly when installing the carrier members 12 and resistive heating elements 14 around the target 2, and the flexible extensions 79 are resilient enough to clasp the carrier members 12 and resistive heating elements 14 to the target 2. As another example, the material of the carrier members 12 may comprise a shape memory alloy such as Nitinol and thus conform to the shape of the target 2 under the application of a thermal load and return to their original state for ease of installation and removal. Such exemplary retaining members shall be construed as being within the scope of the present disclosure.

Figure 13:
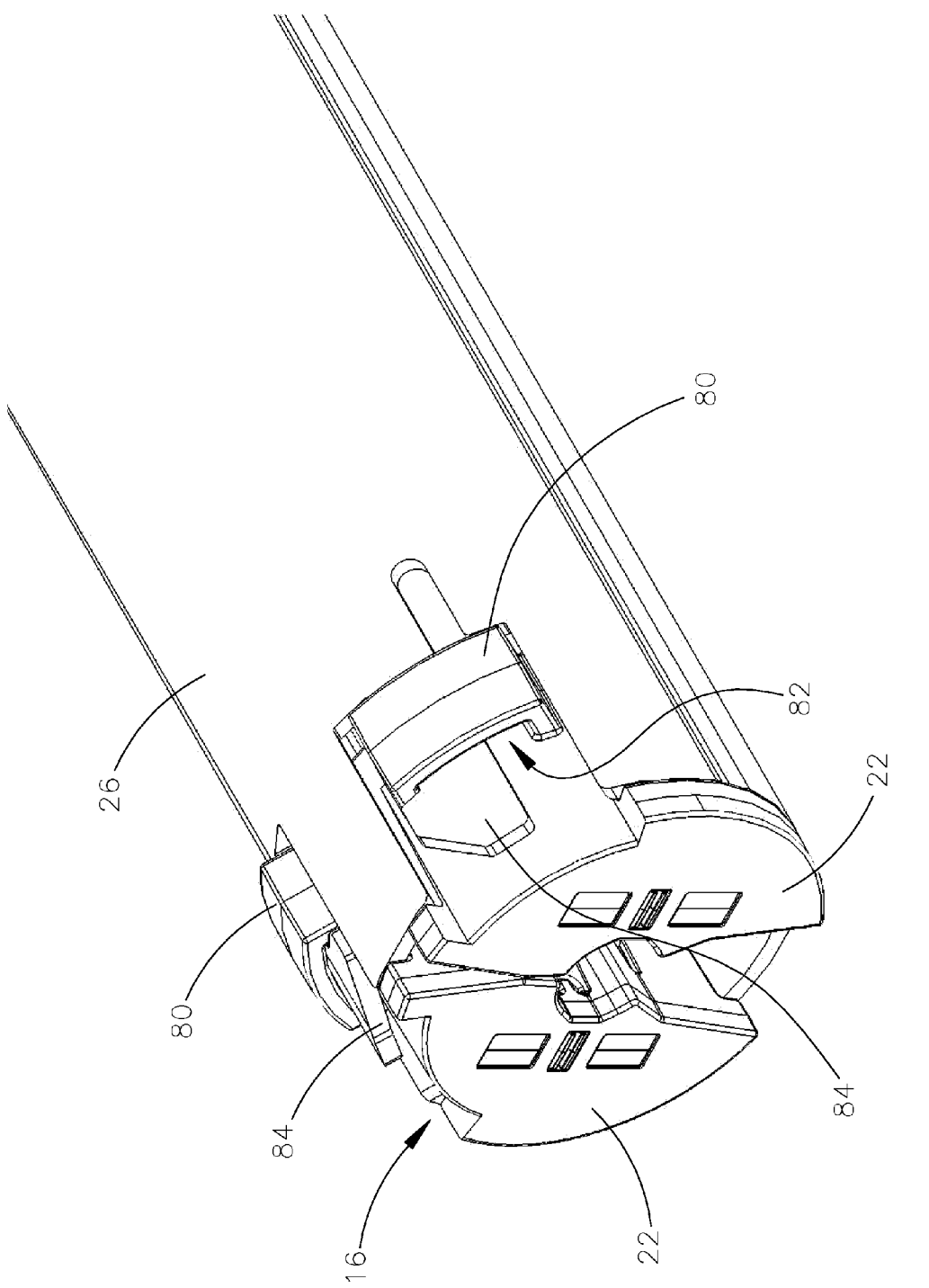
FIG. 13 is an enlarged perspective view of end fittings of the heater system constructed in accordance with the principles of the present disclosure.
Figure 14:
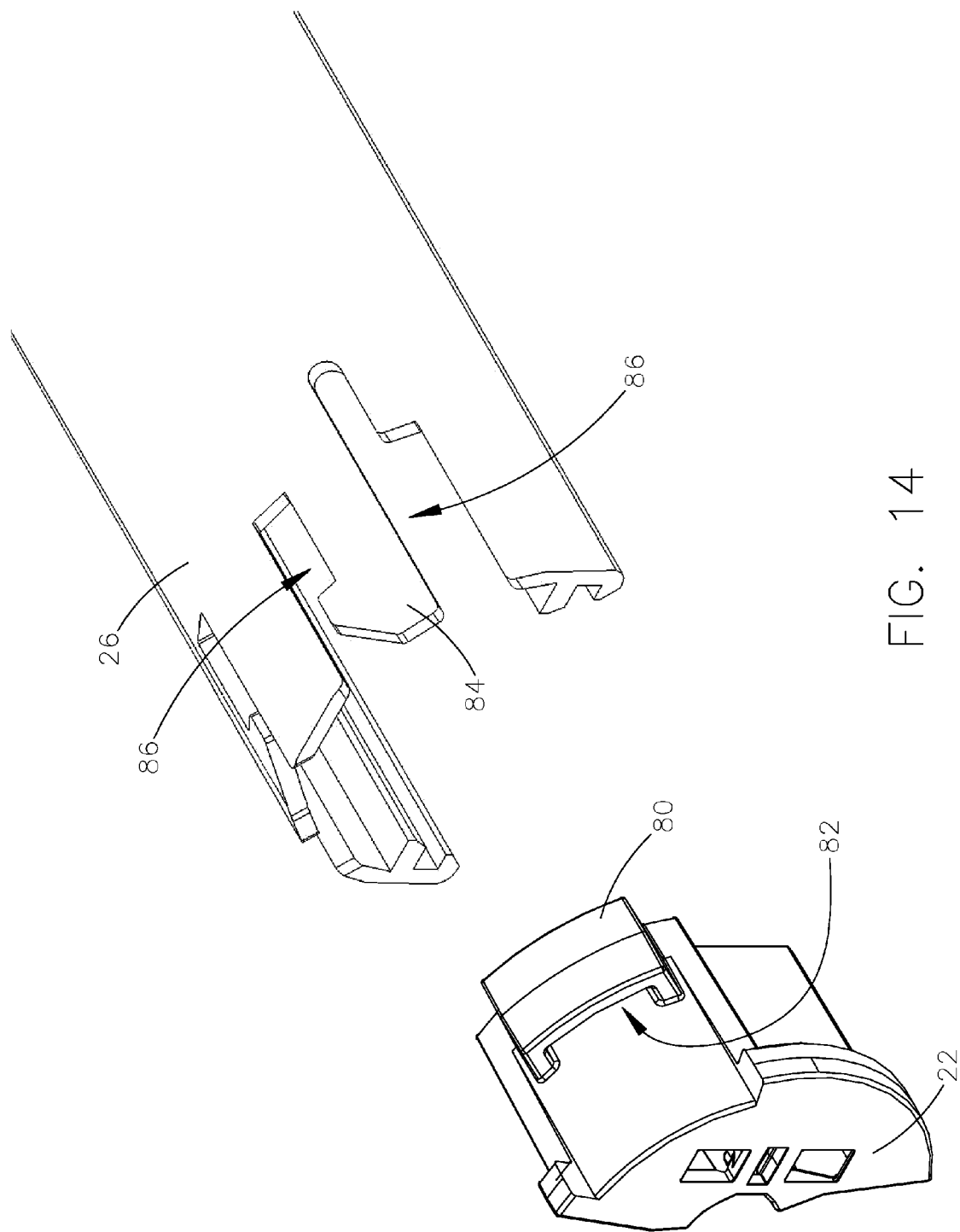
FIG. 14 is a partial exploded view of an end fitting and a cover member constructed in accordance with the principles of the present disclosure.

Referring now to FIGS. 13-14, the cover 26 and end fittings 16 are provided with a locking feature in accordance with one form of the present disclosure. The end fittings 16, and more specifically the outer shells 22, comprises extensions 80 defining slots 82, and the cover 26 comprises corresponding tabs 84 that extend through the slots 82 and lock onto the extensions 80 as shown. The cover 28 thus includes cutouts 86 to define the tabs 84, and the tabs 84 are resilient or flexible in order to engage and lock onto the extensions 80. It should be understood that this specific locking feature is merely exemplary and that other types of locking features may be employed while remaining within the scope of the present disclosure.

Figure 15:
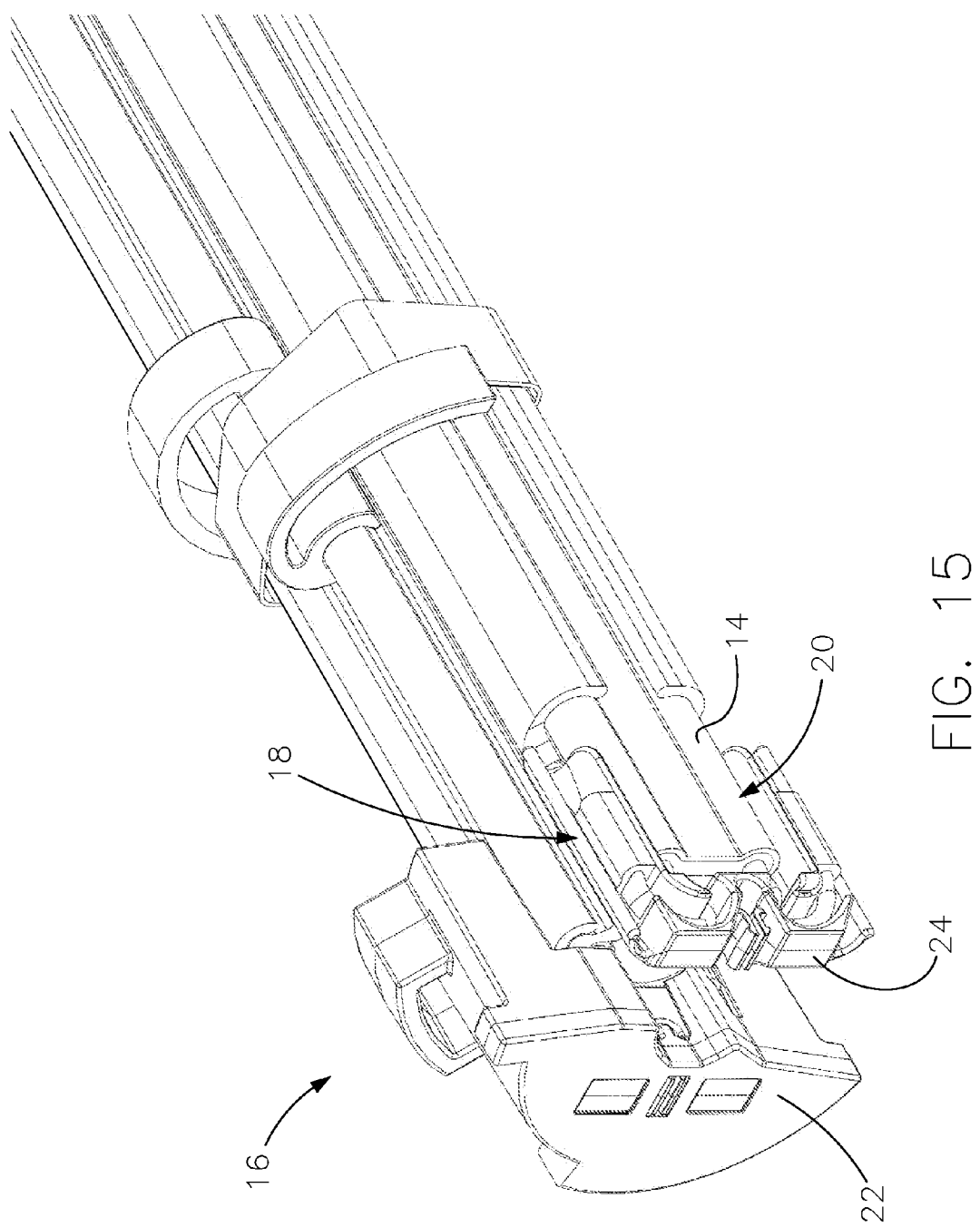
FIG. 15 is a partial perspective view of end portions of the carrier members and heat trace sections in accordance with the principles of the present disclosure.
Figure 17:
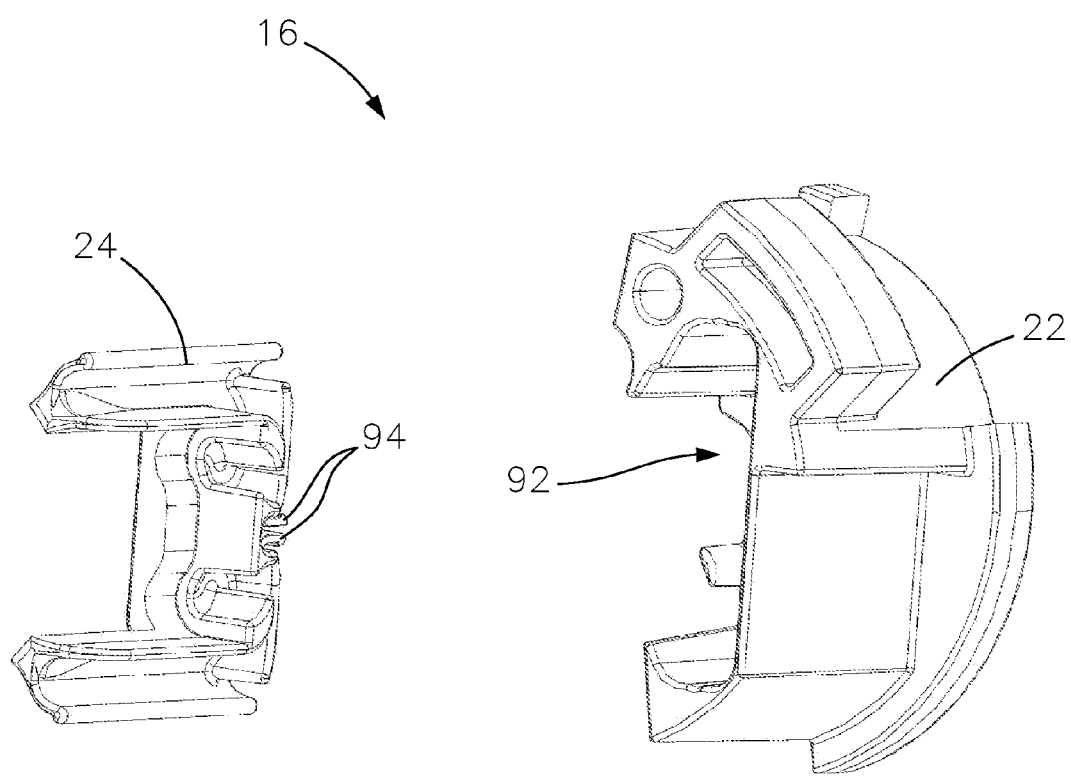
FIG. 17 is an exploded perspective view of the end fitting with the external shell and infernal shield from the opposite side in accordance with the principles of the present disclosure.
Figure 18:
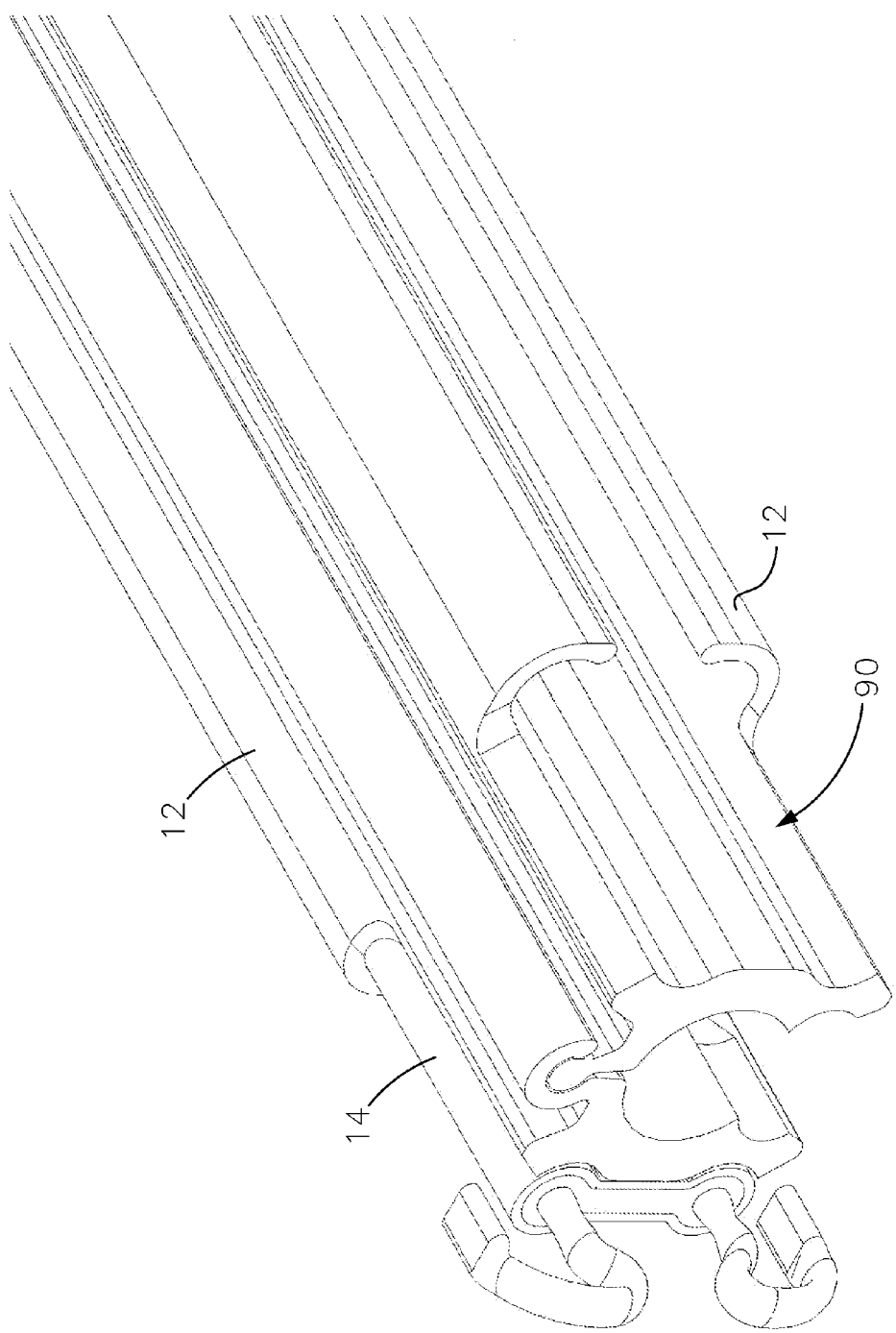
FIG. 18 is a perspective view of carrier members illustrating a cutout constructed in accordance with the principles of the present disclosure.

As shown in FIGS. 15-17, the end fittings 16 are now illustrated and described in greater detail. Each of the end fittings 16, and more specifically the outer shells 22 and the internal shields 24, correspond with at least one carrier member 12 and at least one resistive heating element 14. The carrier members 12 include cutouts 90 (best shown in FIG. 18) at their end portions 18 to accommodate the internal shields 24, which are secured over the end portions 20 of the resistive heating elements 14 as shown. The outer shells 22 and internal shields 24 generally function to provide proper dielectric insulation between conductors of the resistive heating elements 14, lead extensions 40, and crimps 42, and the outside environment, and also to prevent arcing between the electrical lead wires 34 (FIG. 1) and lead extensions 40 (FIG. 3) to the carrier members 12 and the heating target 2. Preferably, the internal shields 24 are mechanically interlocked to the external shells 22 as shown, wherein the internal shields 24 are disposed within cavities 92 of the external shells 22. Additionally, the internal shields 24 comprise locking tabs 94 that extend into apertures 96 formed in the outer shells 22 to secure the internal shields 24 within the external shells 22. Preferably, both the external shells 22 and the internal shields 24 are formed of a high temperature thermoplastic material.

Figure 19B:
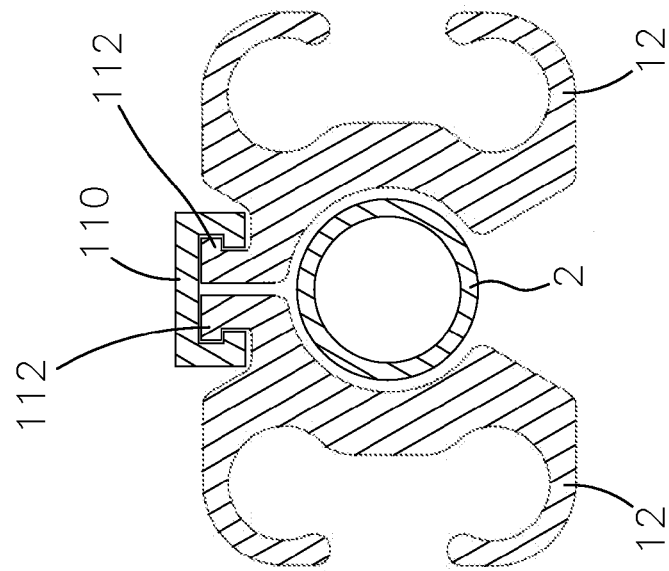
FIG. 19b is a cross-sectional view of another alternate form of carrier members constructed in accordance with the principles of the present disclosure.
Figure 19A:
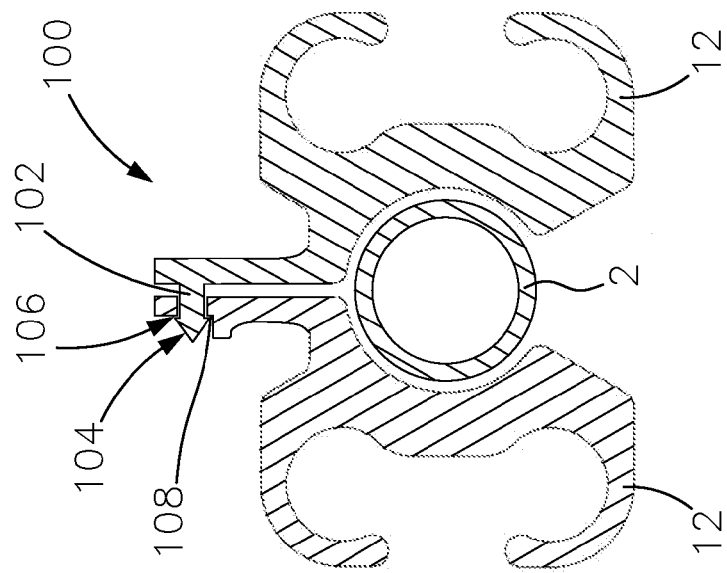
FIG. 19a is a cross-sectional view of an alternate form of carrier members constructed in accordance with the principles of the present disclosure.

Referring now to FIGS. 19a through 19d, alternate forms of connecting portions for the carrier members 12 other than the hinge element as previously set forth are illustrated and described in greater detail. As shown in FIG. 19a, the connecting portions define quick disconnect members 100 that engage each other to connect one carrier member 12 to an adjacent carrier member 12. More specifically, one carrier member 12 defines a protrusion 102 having an extended head portion 104, while the other carrier member 12 defines an aperture 106 having a ledge portion 108. The protrusion 102 is disposed within the aperture 106, and the extended head portion 104 engages the ledge portion 108 to connect the carrier members 12 together.

As shown in FIG. 19b, yet another form of connecting portions define a third element, or locking member 110, to connect one carrier member 12 to an adjacent carrier member 12. In this form, the carrier members 12 are not directly physically connected to each other as in previous embodiments and instead are located with the locking member 110 that is disposed along longitudinal flanges 112 of the carrier members 12. Additionally, the carrier members 12 are advantageously symmetrical such that the same carrier member 12 may be used on both sides of the target 2.

Figure 19D:
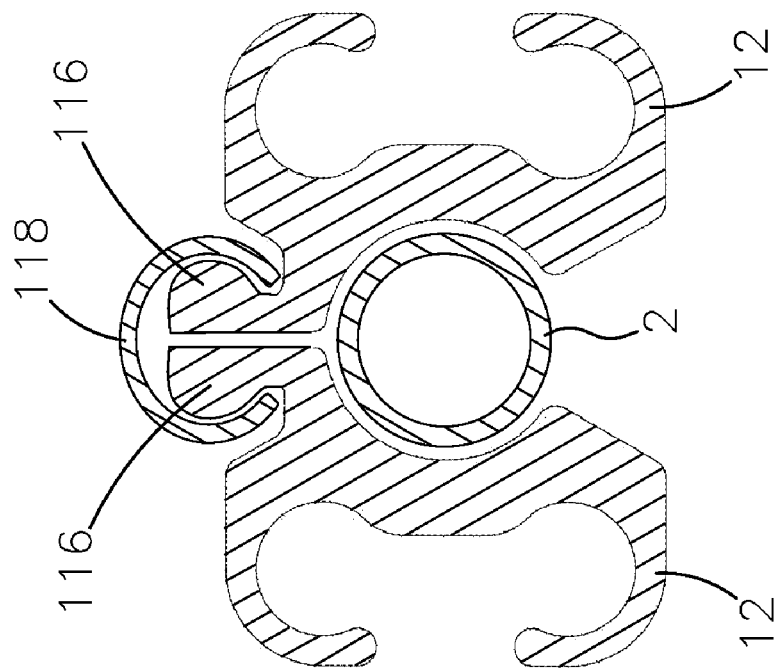
FIG. 19d is a cross-sectional view of still another alternate form of carrier members constructed in accordance with the principles of the present disclosure.
Figure 19C:
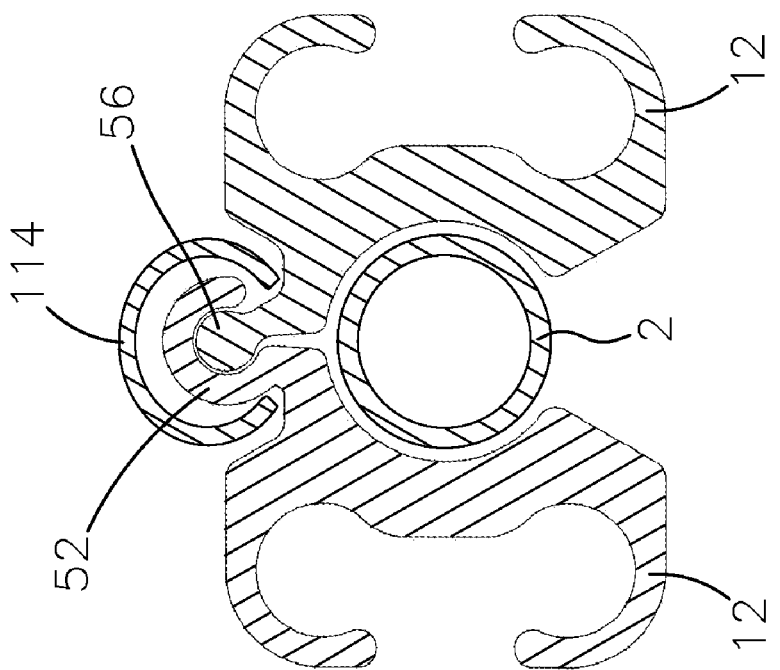
FIG. 19c is a cross-sectional view of yet another alternate form of carrier members constructed in accordance with the principles of the present disclosure.

In FIG. 19c, the connecting portion defines a hinged connection as previously set forth with the longitudinal protrusion 52 and longitudinal rib 56, which is resiliency held together with spring element 114. As shown, spring element 114 engages each of the carrier members 12 generally beneath the hinged connection and provides a force to each of the carrier members 12 to maintain a resilient bias therebetween. Such a spring element 114 thus also functions as a retaining member as previously set forth.

Referring to FIG. 19d, yet another form of a connecting portion defines symmetrical carrier members 12 that comprise longitudinal protuberances 116. A retaining element 118 is disposed around the longitudinal protuberances 116 as shown to maintain the carrier members 12 around the target 2. The retaining element 118 may comprises spring-like properties as with the spring element 114 as described above, or alternately, the retaining element 118 may comprise a rigid material that simply retains the carrier members 12 around the target 2.

Another form of connecting portions may include a magnetic connection, wherein one carrier member 12 carries a positive charge proximate the connecting portion and the other carrier member 12 carries a negative charge proximate the connecting portion. Accordingly, a variety of connecting portions may be employed while remaining within the scope of the present disclosure, and thus the hinged carrier members as previously set forth should not be construed as limiting the scope of the present disclosure. Moreover, the carrier members 12 need not include connecting portions at all and may instead be self-engaging with the target while remaining within the scope of the present disclosure.

Figure 20:
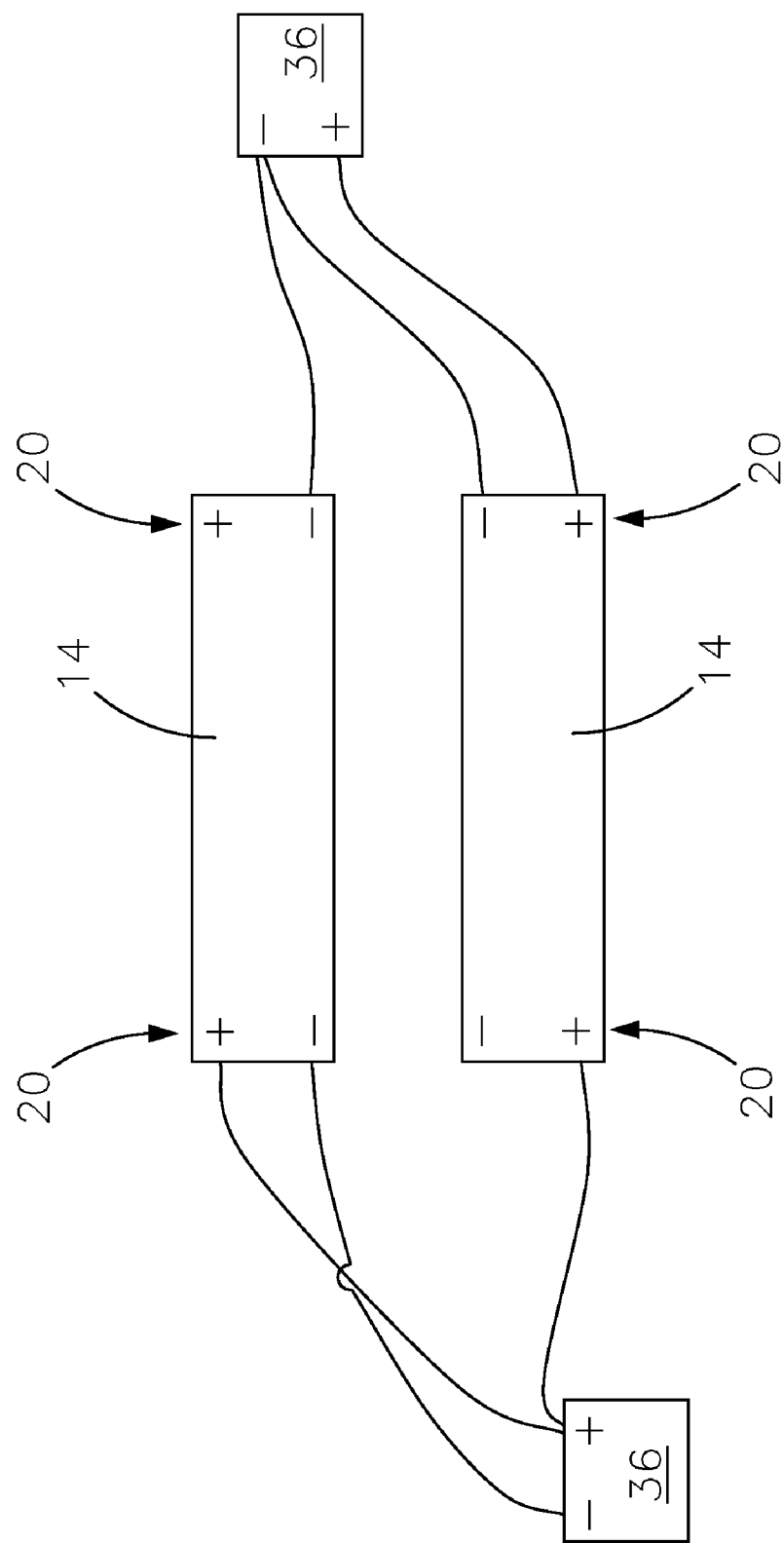
FIG. 20 is a schematic view illustrating connection of electrical lead wires between the carrier members and resistive heating elements and a power source in accordance with the principles of the present disclosure.

Referring now to FIG. 20, one form of electrically connecting the resistive heating elements 14 is illustrated, wherein only three (3) electrical lead wire are used rather than the conventional four (4) wires. As shown, each resistive heating element includes three (3) electrical lead wires 34 extending from its end portions 20, which extend to connectors 36. The lead wires 34 can then be connected to any number of sources such as a power controller (not shown), a power source (not shown), or another resistive heating element 14. As such, with only three (3) lead wires 34, the total number of wires and complexity of the heater system 10 can be reduced.

Figure 21:
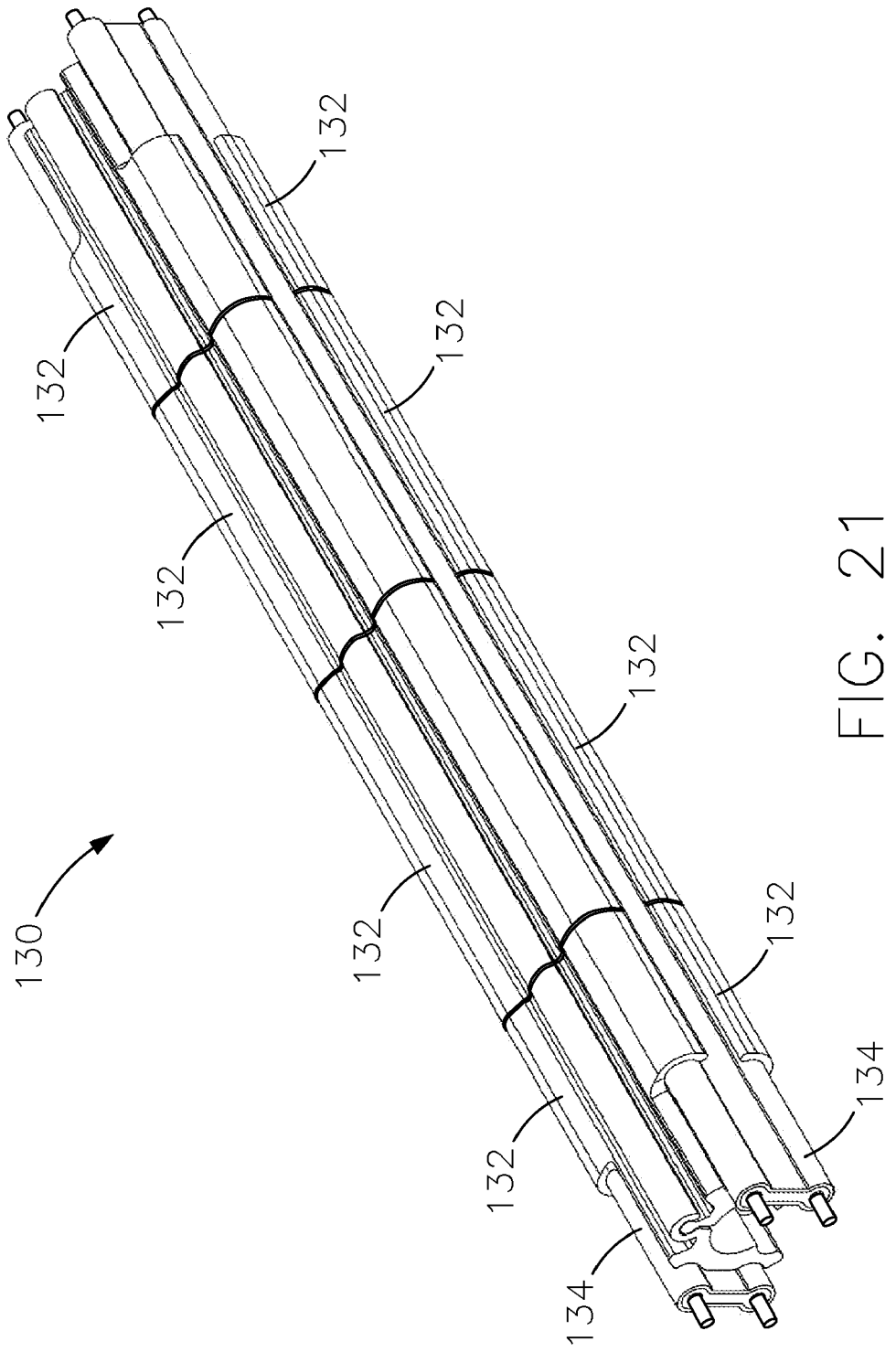
FIG. 21 is a perspective view illustrating multiple carrier members and a resistive heating element constructed in accordance with the principles of the present disclosure.

Referring to FIG. 21, yet another form of a heater system 10 is illustrated and generally indicated by reference numeral 130. As shown, the heater system 130 includes a plurality of carrier members 132 extending along the length of individual resistive heating elements 134. Accordingly, more than one carrier member 132 per resistive heating element 134 is provided in this form of the present disclosure. It should be understood that such variations for the carrier members shall be construed as being within the scope of the present disclosure and thus the specific shapes and orientations of the carrier members as illustrated and described herein shall not be construed as limiting the scope of the present disclosure.

As shown in FIGS. 22a and 22b, additional devices to secure the resistive heating elements 14 within the carrier members 12 for improved heat transfer are provided in accordance with the principles of the present disclosure. (Only one set of a earner member 12 and a resistive heating element 14 are illustrated for purposes of clarity). In FIG. 22a, a retaining member 140 is disposed within extended arms 142 of the carrier member 12. More specifically, the retaining member 140 is disposed within grooves 144 formed within the extended arms 142, and the retaining member 140 is a flexible, spring-like material (such as spring steel, by way of example) that applies a force to the resistive heating element 14 when installed within the carrier member 12. The retaining member 140 may be continuous or discontinuous along the length of the carrier member 12 while remaining within the scope of the present disclosure.

Referring to FIG. 22*b*, another form of a retaining member is illustrated and generally indicated by reference numeral 150. The retaining member 150 is secured around the carrier member 12 as shown to retain the resistive heating element 14 within the carrier member 12. Furthermore, the retaining member 150 provides a standoff between the cover 28 and the target 2 (not shown) disposed within the carrier members 12 and resistive heating elements 14. As such, the retaining member 150 provides a dual-function in both retaining the resistive heating element 14 and providing a standoff for a desired positioning of the cover 26 relative to the target 2 in accordance with the principles of the present disclosure. The retaining member 150 may be a high temperature polymer material or a metal clip, by way of example. It should also be understood that the retaining member 150 may be continuous or discontinuous along the length of the carrier member 12 while remaining within the scope of the present disclosure.

Although the above-described heater system 10 has been illustrated and detailed as having a construction similar to a conventional heat trace cable, it should be understood that other types of heater construction besides a heat trace cable construction may also be employed while remaining within the scope of the present disclosure. A heater type such as a polymer heater or a layered film heater, among others, should be construed as being within the scope of the present disclosure.

The description herein is merely exemplary in nature and, thus, variations that do not depart from the gist of the disclosure are intended to be within the scope of the claimed invention. Such variations and concepts shall include those disclosed in copending U.S. application Ser. No. 11/520,130, filled "Modular Heater Systems," which is commonly assigned with the present application and the contents of which are incorporated herein by reference in their entirety.

What is claimed is:

1. A heater system comprising:
   a plurality of carrier members, each carrier member defining an inner periphery surface, an outer receiving portion, and connecting portions;
   at least one resistive heating element disposed within one of the outer receiving portions of the carrier members;
   end fittings disposed proximate end portions of the carrier members and the resistive heating element; and
   at least one cover disposed around the carrier members and the resistive heating element, the cover being secured to the end fittings,
   wherein the inner periphery surfaces of the carrier members are adapted to transfer heat to a target and the connecting portions are adapted to be secured to at least one of an adjacent carrier member and a heating target.

2. The heater system according to claim 1, wherein one of the carrier members defines a longitudinal protrusion having an internal channel, and an adjacent carrier member defines a longitudinal rib, wherein the longitudinal rib is disposed within the channel to provide a rotatable connection between the carrier members.

3. The heater system according to claim 2 further comprising at least one retaining member disposed around at least a portion of the carrier members to clasp the carrier members around the target.

4. The heater system according to claim 3, wherein the retaining member defines a flexible clip member.

5. The heater system according to claim 1 further comprising at least one standoff member disposed along the heater system between the cover and the target.

6. The heater system according to claim 5, wherein the standoff comprises:
   a central body portion; and
   opposed curved arms extending from the central body portion.

7. The heater system according to claim 5, wherein the central body portion defines a cavity that is adapted for placement around a portion of the carrier member.

8. The heater system according to claim 1, wherein the carrier members are Aluminum extrusions.

9. The heater system according to claim 1, wherein the at least one resistive heating element is a heat trace section.

10. The heater system according to claim 9, wherein the heat trace section is conformable to a shape defined by the outer receiving portions of the carrier members.

11. The heater system according to claim 1, wherein the end fittings comprise slots and the cover comprises corresponding tabs, wherein the tabs engage the slots to secure the cover to the end fittings.

12. The heater system according to claim 1, wherein the end fittings comprise an internal shield and an external shell disposed around the internal shield, wherein the internal shield is mechanically interlocked to the external shell.

13. The heater system according to claim 12, wherein each internal shield and each external shell corresponds with at least one carrier member and at least one resistive heating element.

14. The heater system according to claim 1, wherein the plurality of carrier members comprises two carrier members, and further comprising two resistive heating elements.

15. The heater system according to claim 1 comprising two covers that are interlocked along longitudinal edge portions thereof.

16. The heater system according to claim 1, wherein at least one of the carrier members defines a recess that is adapted for placement around an adjacent component disposed along the heating target.

17. The heater system according to claim 1, wherein the connecting portions are rotatably engageable.

18. The heater system according to claim 1, wherein the connecting portions define locking members.

19. The heater system according to claim 1 further comprising at least one retaining member disposed around at least a portion of the carrier members to clasp the carrier members around the target.

20. The heater system according to claim 1, wherein the connecting portion defines a magnetic connection.

21. The heater system according to claim 1, wherein the carrier members comprise a shape memory alloy.

22. A heater system comprising:
   a plurality of carrier members, each carrier member defining an inner periphery surface, an outer receiving portion, and connecting portions;
   a plurality of resistive heating elements disposed within the outer receiving portions of the carrier members;
   end fittings disposed proximate end portions of the carrier members and the resistive heating elements; and
   at least one cover disposed around the carrier members and the resistive heating elements, the cover being secured to the end fittings,
   wherein the inner periphery surfaces of the carrier members are adapted to transfer heat to a target and the connecting portions are adapted to be secured to at least one of an adjacent carrier member and a heating target.

23. The heater system according to claim 22, wherein the connecting portions are hinges.

24. The heater system according to claim 22, wherein the connecting portions are rotatably engageable.

25. The heater system according to claim 22, wherein the connecting portions define quick disconnect members.

26. The heater system according to claim 22, wherein the connecting portions define locking members.

27. The heater system according to claim 22, wherein at least one of the carrier members defines a recess that is adapted for placement around an adjacent component disposed along the heating target.

28. A heater system comprising a plurality of carrier members and a corresponding plurality of resistive heating elements disposed within the carrier members, wherein at least one set of a carrier member and a resistive heating element are resiliently movable such that the heater system provides tactile feedback to an installer when the carrier member properly engages and is properly installed around a target.

29. The heater system according to claim 28, wherein the carrier members comprise connecting portions that are adapted to be secured to at least one of an adjacent carrier member and the target.

30. The heater system according to claim 28 further comprising at least one retaining member disposed around at least a portion of the carrier members to clasp the carrier members around the target.

31. A heater system comprising:
a plurality set of carrier members, each carrier member defining an inner periphery surface, an outer receiving portion, and connecting portions; and
at least one resistive heating element disposed within one of the outer receiving portions of the carrier members,
wherein the inner periphery surfaces of the carrier members are adapted for close proximity with a heating target, and
wherein the connecting portions of each set of the carrier members are removably connected to form a hinge.

32. The heater system according to claim 31, wherein the resistive heating element defines a heat trace section.

33. The heater system according to claim 31, further comprising a plurality of resistive heating elements that are electrically connected to each other and to a power source using three electrical lead wires.

34. The heater system according to claim 31, wherein at least one of the carrier members defines a recess that is adapted for placement around an adjacent component disposed along the heating target.

* * * * *